United States Patent
Zaitsu et al.

(10) Patent No.: US 9,774,958 B2
(45) Date of Patent: Sep. 26, 2017

(54) UNIT, ELECTRONIC DEVICE, AND METHOD OF MANUFACTURING ELECTRONIC DEVICE

(71) Applicant: KYOCERA CORPORATION, Kyoto (JP)

(72) Inventors: Masayuki Zaitsu, Sagamihara (JP); Hiroto Yahagi, Yokohama (JP); Kazuchika Suzuki, Machida (JP); Sachihiro Utsumi, Yokohama (JP); Taichi Kim, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/894,734

(22) PCT Filed: May 29, 2014

(86) PCT No.: PCT/JP2014/002852
§ 371 (c)(1),
(2) Date: Nov. 30, 2015

(87) PCT Pub. No.: WO2014/192301
PCT Pub. Date: Dec. 4, 2014

(65) Prior Publication Data
US 2016/0127836 A1    May 5, 2016

(30) Foreign Application Priority Data

May 30, 2013 (JP) .................. 2013-114009
Mar. 20, 2014 (JP) .................. 2014-058024
Mar. 20, 2014 (JP) .................. 2014-058025

(51) Int. Cl.
*H04M 1/00*     (2006.01)
*H04R 17/00*    (2006.01)
(Continued)

(52) U.S. Cl.
CPC .......... *H04R 17/00* (2013.01); *H04M 1/0249* (2013.01); *H04M 1/0266* (2013.01);
(Continued)

(58) Field of Classification Search
USPC ...................................... 455/550.1
See application file for complete search history.

(56) References Cited

U.S. PATENT DOCUMENTS 7,936,571 B2    5/2011   Tan et al.
9,544,413 B2    1/2017   Sudo et al.
(Continued)

FOREIGN PATENT DOCUMENTS

JP    S57-128299      2/1981
JP    H02-106983 A    4/1990
(Continued)

OTHER PUBLICATIONS

International Search Report issued in PCT/JP2014/002852, dated Sep. 9, 2014.
Written Opinion issued in PCT/JP2014/002852, dated Sep. 9, 2014.

*Primary Examiner* — Creighton Smith
(74) *Attorney, Agent, or Firm* — Studebaker & Brackett PC

(57) ABSTRACT

According to one of aspects, provided is an electronic device including a panel 10, a piezoelectric element 30 attached to the panel 10, and a substrate 25 attached to a main surface of the piezoelectric element 30. The panel 10 is configured to be deformed due to deformation of the piezoelectric element 30, and sound is transmitted to an object that is in contact with the deformed panel 10. The substrate 25 includes a base 25a made of resin, and signal lines 25b and 25c laminated with the base 25a and connected to the main (Continued)

surface of the piezoelectric element 30. The substantially the entire main surface of the piezoelectric element 30 is covered by the base 25a.

30 Claims, 24 Drawing Sheets

(51) Int. Cl.
    *H04M 1/03*     (2006.01)
    *H04R 7/04*     (2006.01)
    *H04R 31/00*     (2006.01)
    *H04M 1/02*     (2006.01)
    *H04R 1/06*     (2006.01)

(52) U.S. Cl.
    CPC ............... *H04M 1/03* (2013.01); *H04R 1/06* (2013.01); *H04R 7/045* (2013.01); *H04R 31/006* (2013.01); *H04R 2440/01* (2013.01); *H04R 2440/05* (2013.01); *H04R 2460/13* (2013.01); *H04R 2499/11* (2013.01)

(56) References Cited

U.S. PATENT DOCUMENTS

| | | | | |
|---|---|---|---|---|
| 2003/0193270 A1* | 10/2003 | Hyun | ................ | H01L 41/053 310/348 |
| 2007/0071259 A1* | 3/2007 | Tojo | ................ | G06F 1/1605 381/152 |
| 2008/0290758 A1* | 11/2008 | Hayashi | ................ | B06B 1/0644 310/326 |
| 2009/0086397 A1 | 4/2009 | Tan et al. | | |
| 2013/0241352 A1 | 9/2013 | Hayashi et al. | | |
| 2014/0063365 A1* | 3/2014 | Li | ................ | G02F 1/13394 349/12 |
| 2014/0341357 A1* | 11/2014 | Smith | ................ | H04M 11/04 379/39 |
| 2015/0043748 A1* | 2/2015 | Sudo | ................ | H04R 17/00 381/102 |
| 2015/0043758 A1* | 2/2015 | Yamada | ................ | G10K 11/178 381/151 |
| 2015/0086047 A1* | 3/2015 | Horii | ................ | H04R 7/10 381/151 |
| 2015/0119109 A1* | 4/2015 | Sudo | ................ | H04R 7/045 455/566 |

FOREIGN PATENT DOCUMENTS

| | | |
|---|---|---|
| JP | H03-073581 A | 3/1991 |
| JP | H06-112361 A | 4/1994 |
| JP | H06-122359 A | 5/1994 |
| JP | H11-026829 A | 1/1999 |
| JP | 2005-033505 A | 2/2005 |
| JP | 2005-348193 A | 12/2005 |
| JP | 2008-147492 A | 6/2008 |
| JP | 2008-211047 A | 9/2008 |
| JP | 2009-089528 A | 4/2009 |
| JP | 5255142 B1 | 8/2013 |
| WO | 2010/106736 A1 | 9/2010 |
| WO | 2012/117738 A1 | 9/2012 |
| WO | 2013/051328 A1 | 4/2013 |
| WO | 2013/164980 A1 | 11/2013 |

\* cited by examiner

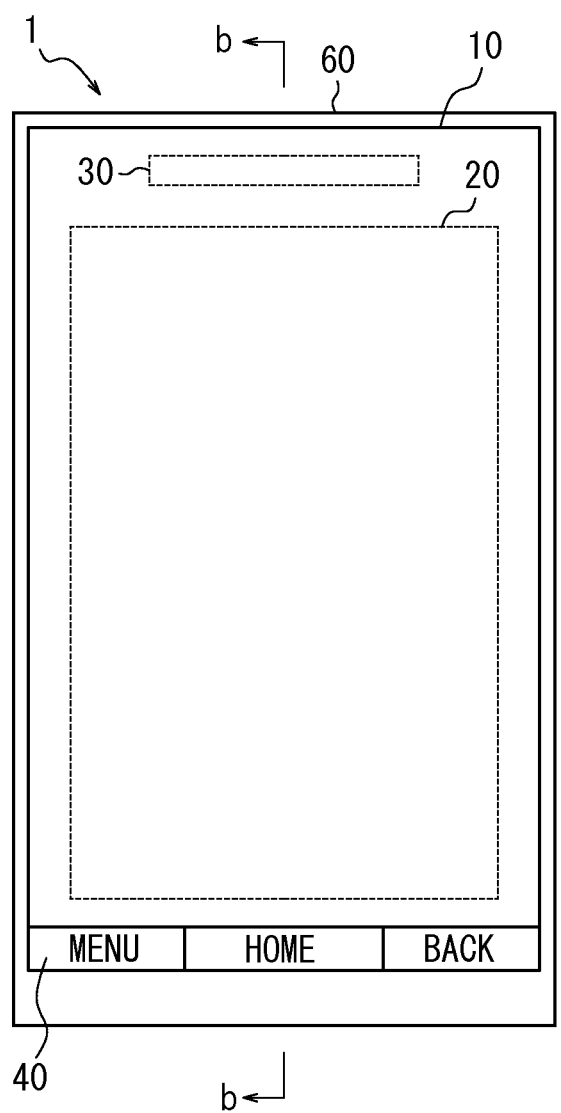
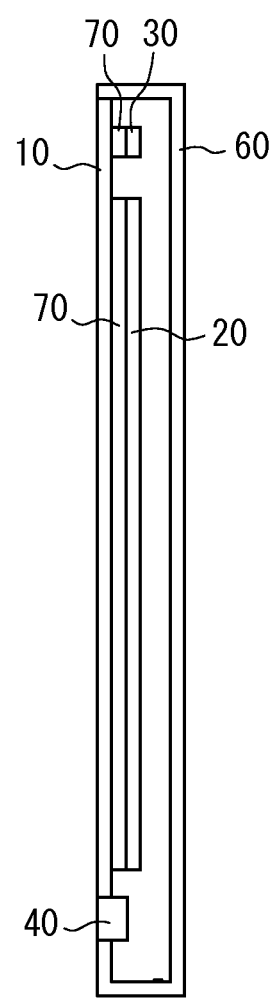
FIG. 3A
FIG. 3B

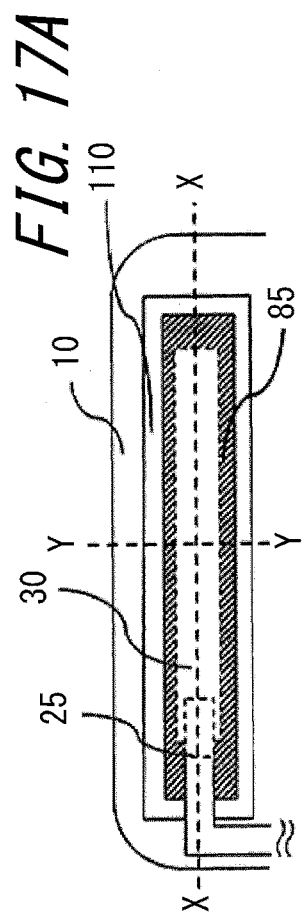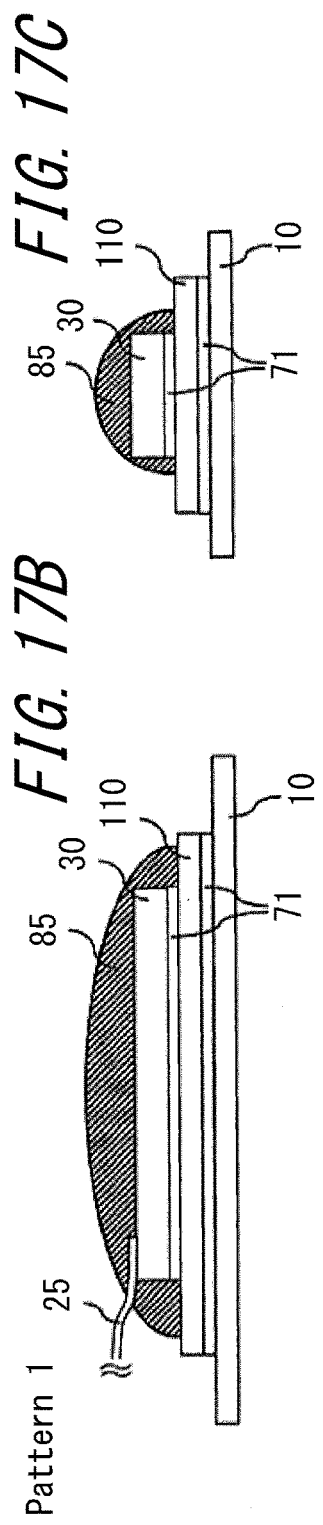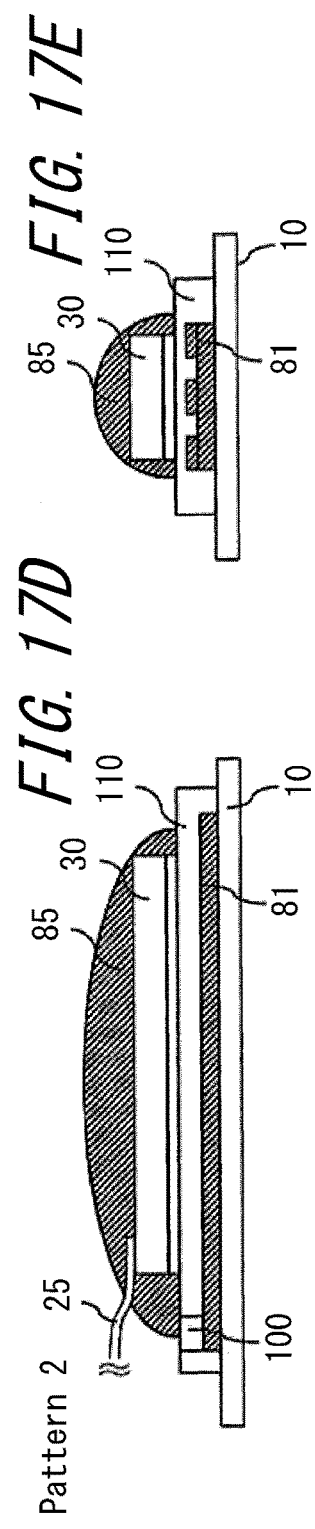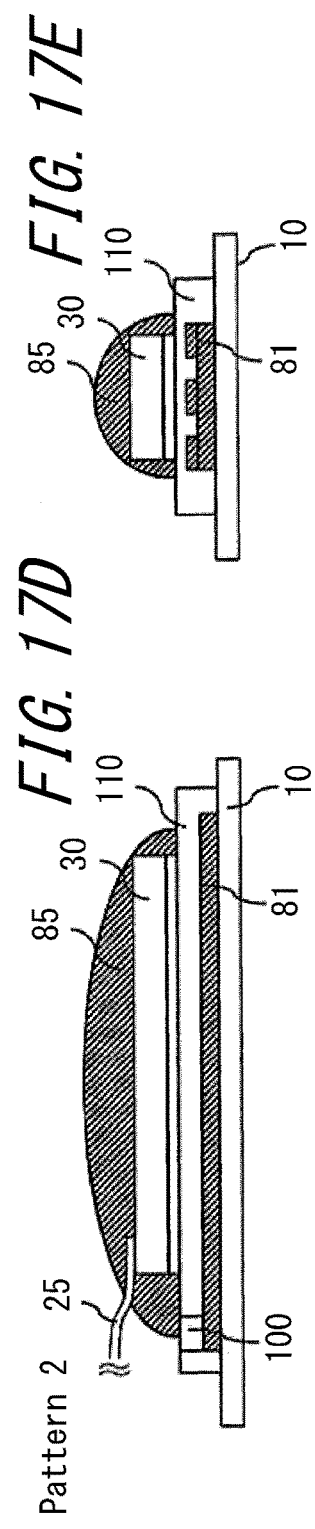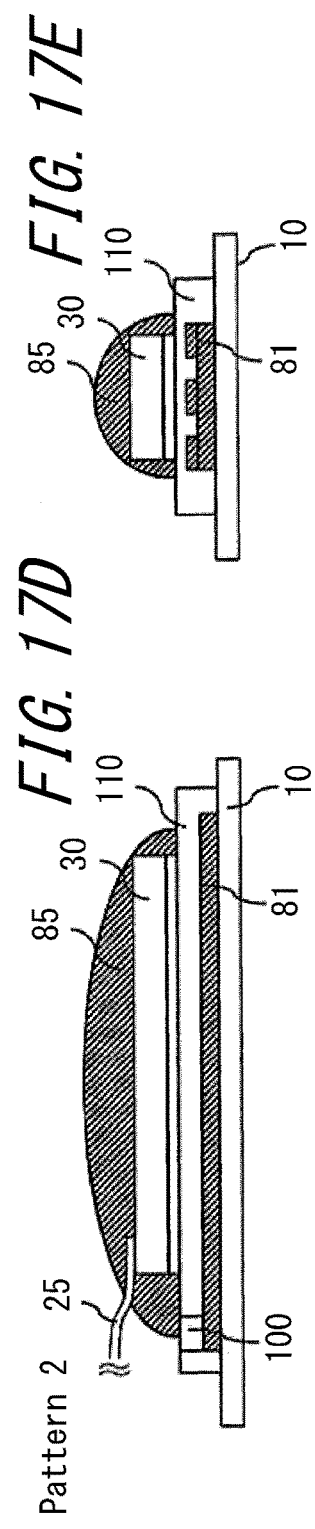

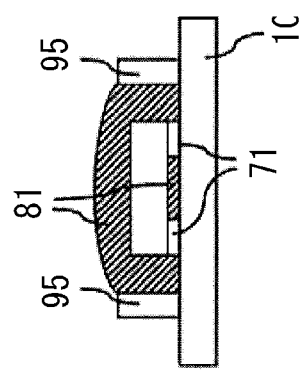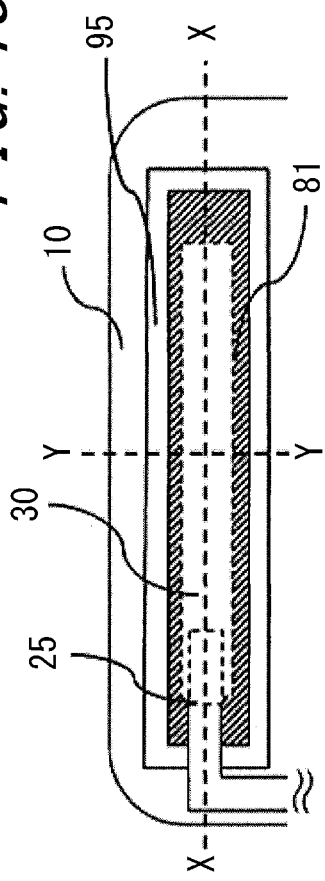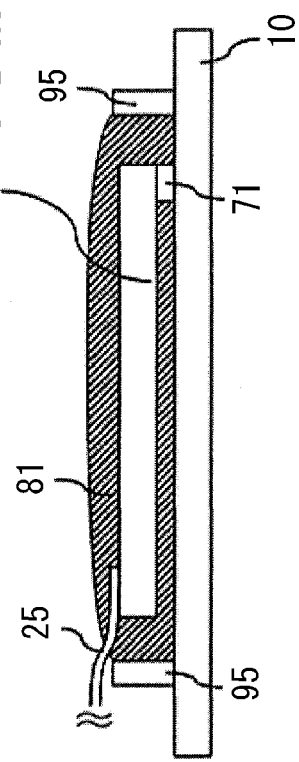

Pattern 1

Pattern 2

Pattern 3

Pattern 4

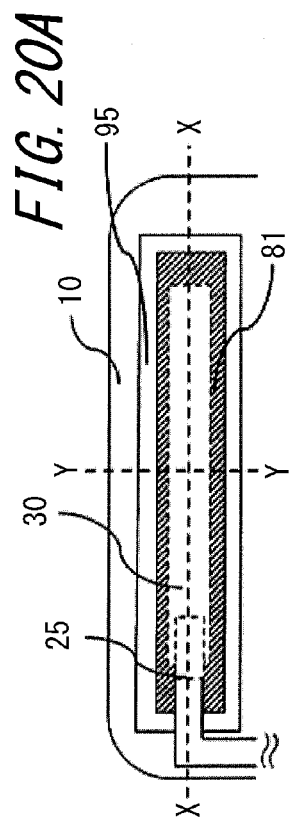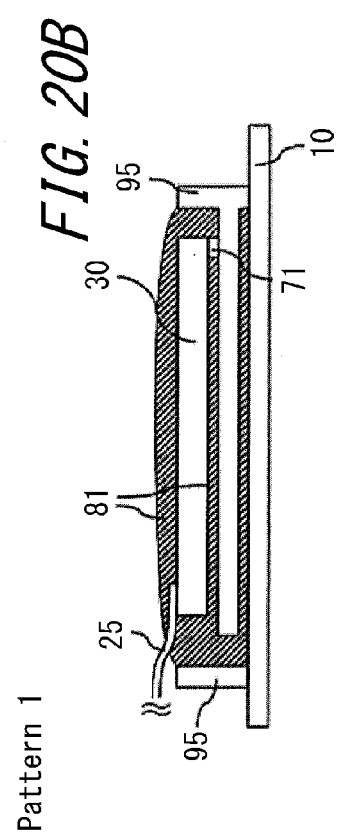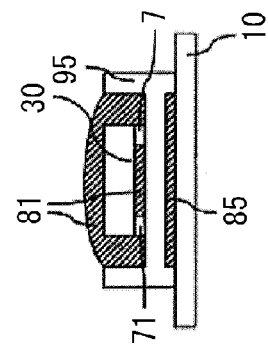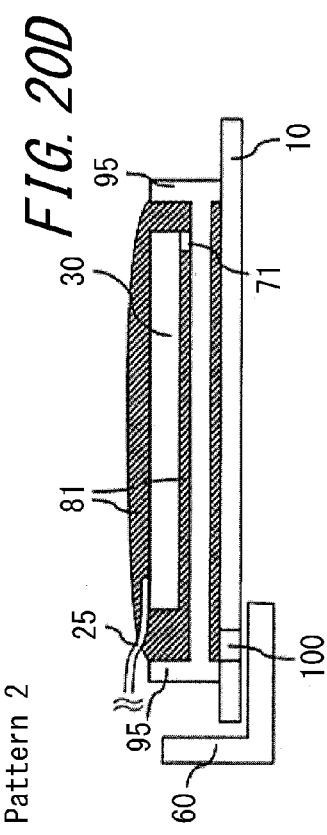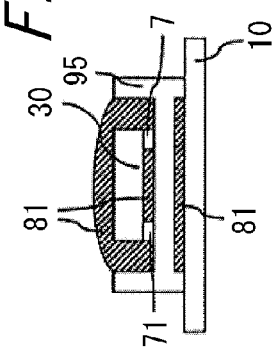

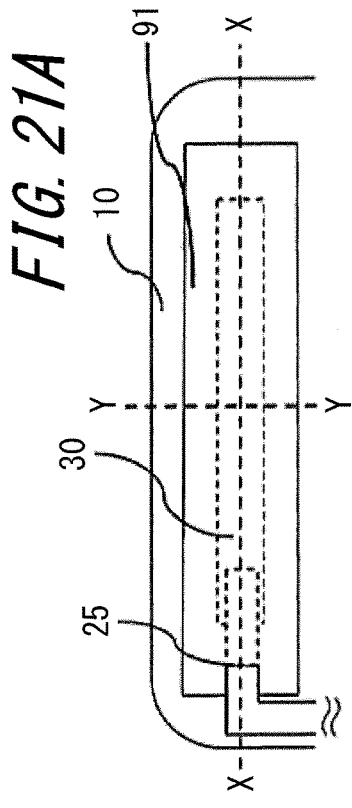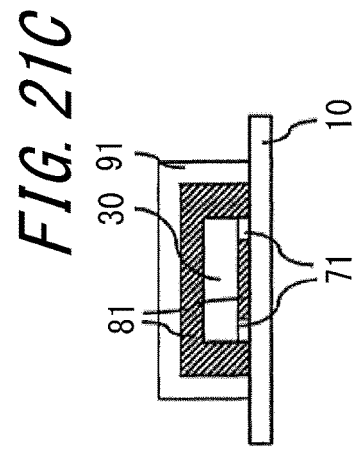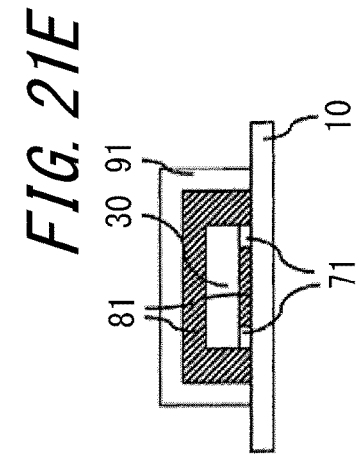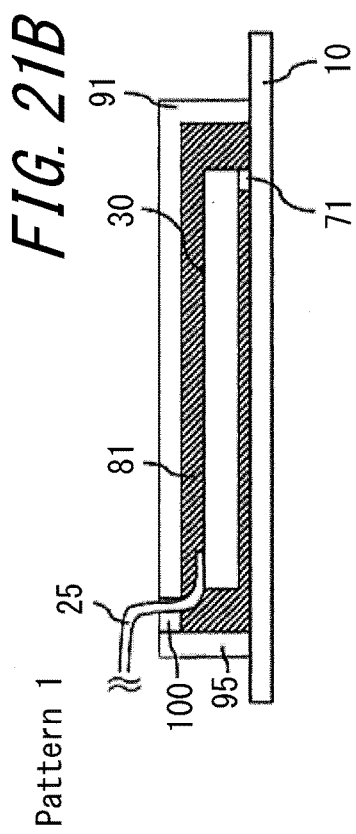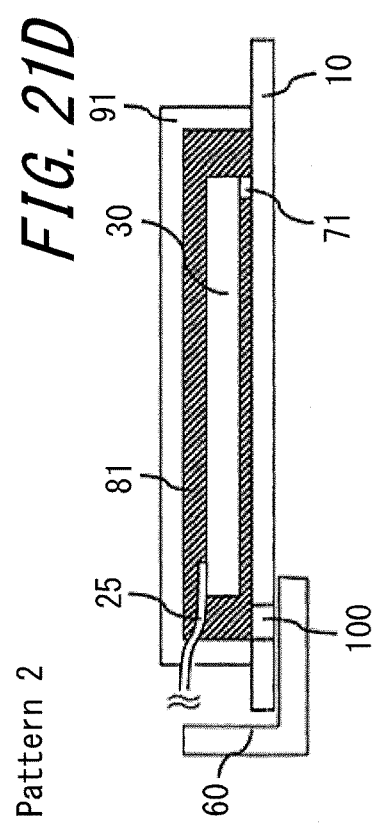

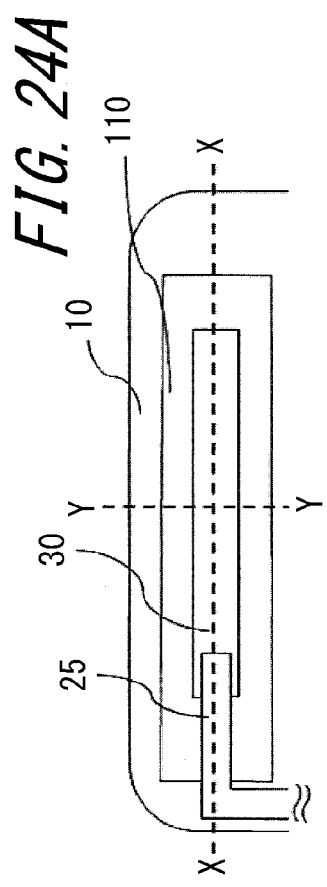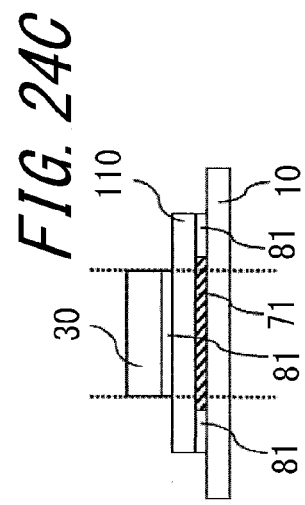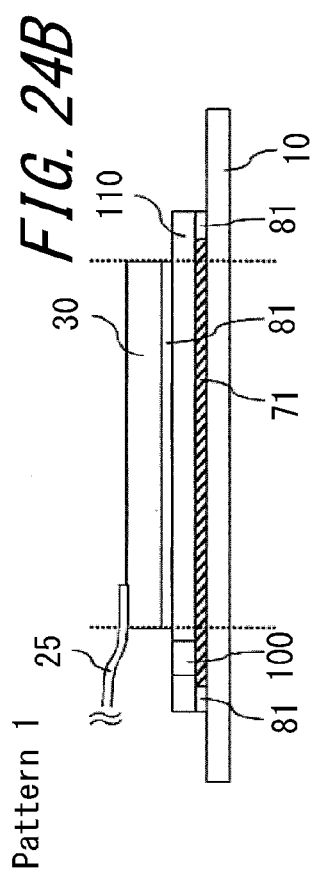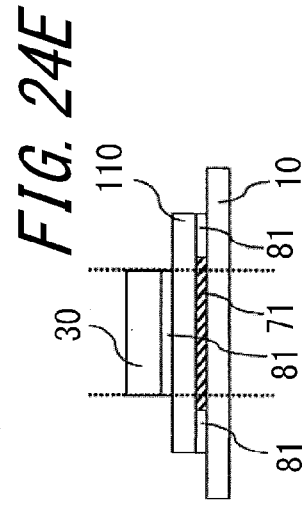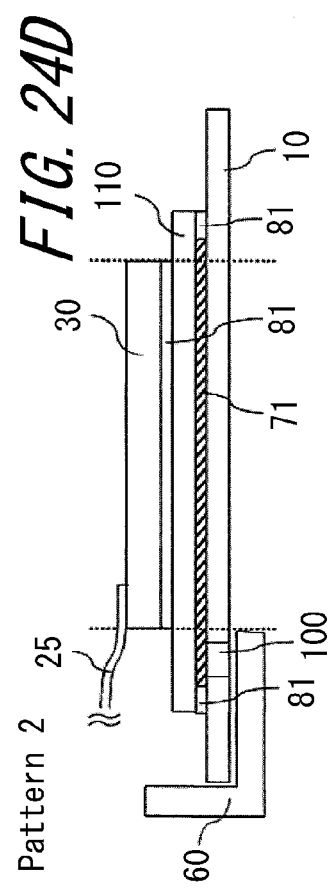

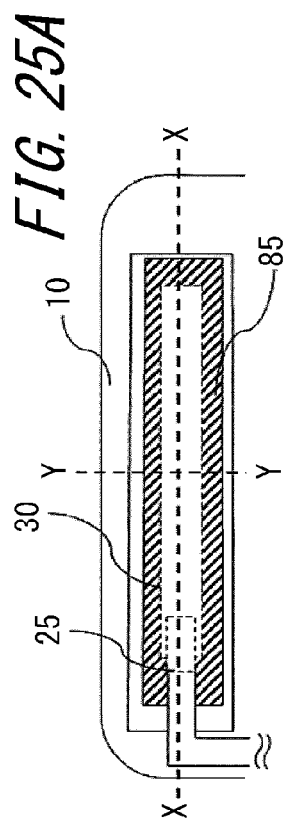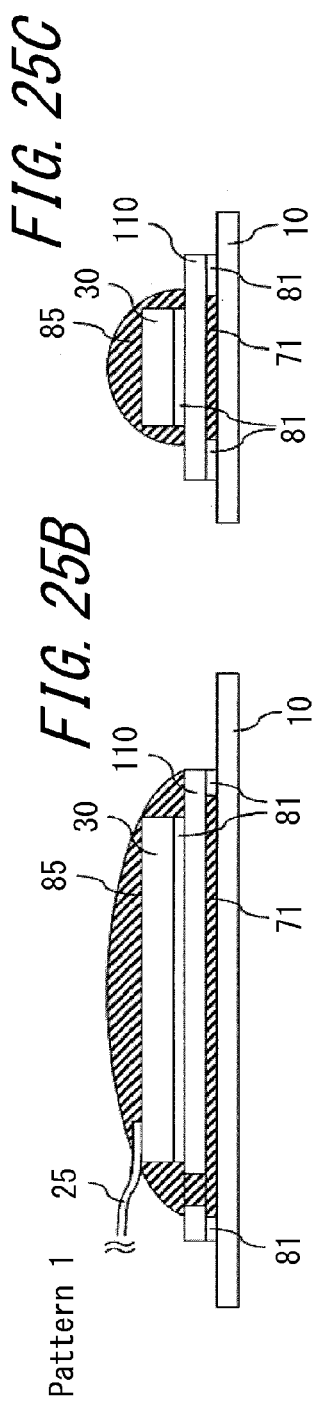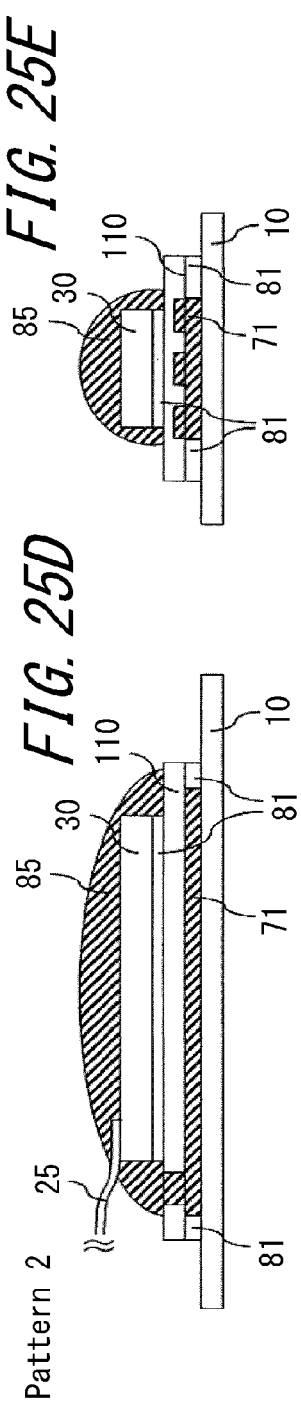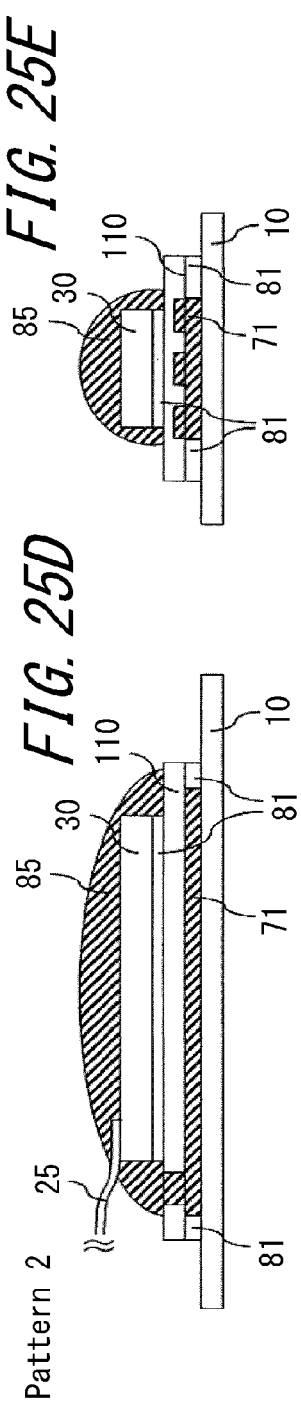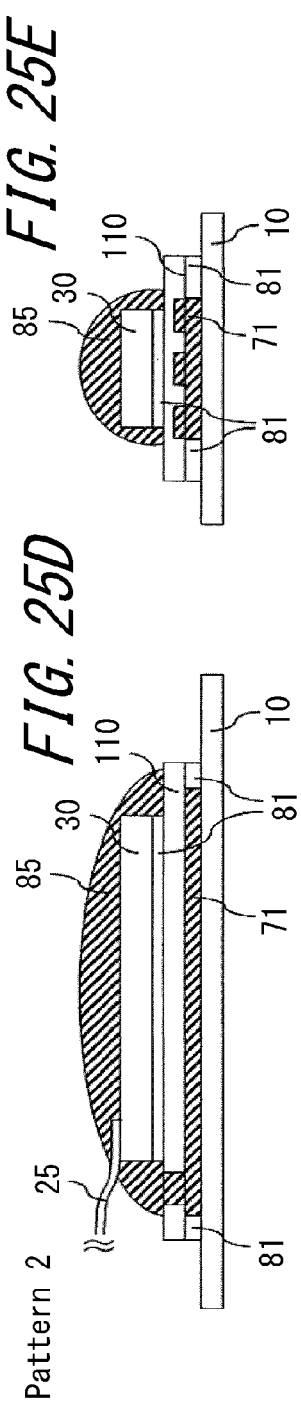

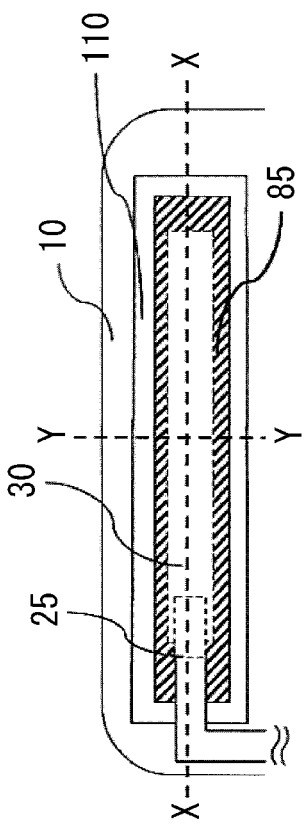
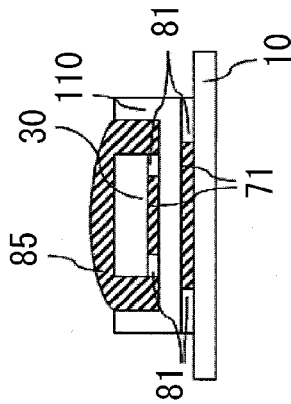
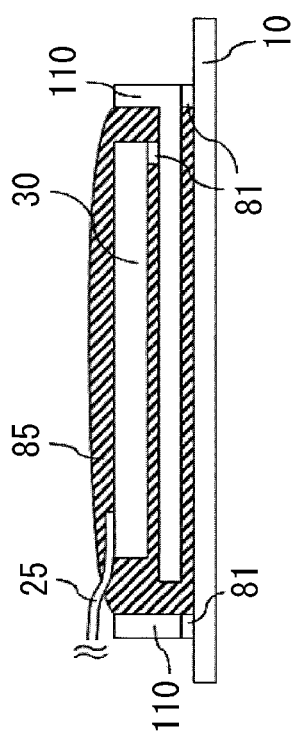
FIG. 26A
FIG. 26B
FIG. 26C

UNIT, ELECTRONIC DEVICE, AND METHOD OF MANUFACTURING ELECTRONIC DEVICE

CROSS-REFERENCE TO RELATED APPLICATION

The present application claims priority to and the benefit of Japanese Patent Application No. 2013-114009 filed on May 30, 2013, Japanese Patent Application No. 2014-058024 filed on Mar. 20, 2014, and Japanese Patent Application No. 2014-058025 filed on Mar. 20, 2014. The entire contents of these documents are incorporated herein by reference.

TECHNICAL FIELD

The present disclosure relates to an electronic device that vibrates a member (e.g., a panel) to which a piezoelectric element is attached, by applying a predetermined electric signal (i.e., a sound signal) to the piezoelectric element and that conveys the vibration of the member to a human body to thereby transmit vibration sound to a user through a part of the human body.

BACKGROUND

Patent Literature 1 describes an electronic device, such as a mobile phone, that transmits air conduction sound and bone conduction sound to a user. Patent Literature 1 also describes that the air conduction sound is sound perceived by an auditory nerve of a user as a result of an eardrum being vibrated by an air vibration that is created by a vibration of an object and that travels through an external auditory canal down to the eardrum. Patent Literature 1 also describes that the vibration sound is sound perceived by an auditory nerve of a user through a part of the body (for example. Cartilaginous portion) of the user which contacts with the vibrating object.

In the mobile phone described in Patent Literature 1, a rectangular plate-shaped vibration body configured by piezoelectric bimorph and a flexible material is attached to an outer surface of a housing by way of an elastic member. Patent Literature 1 also describes that, upon application of a voltage to the piezoelectric bimorph of the vibration body, the piezoelectric material is expanded and contracted in a longitudinal direction, thereby causing the vibration body to undergo flexure vibration. As a result, when the user places the vibration body in contact with an auricle, air conduction sound and vibration sound are transmitted to the user.

Patent Literature 2 describes an electronic device, such as a mobile phone terminal, that vibrates a panel due to deformation of a piezoelectric element attached to the panel, to thereby transmit human-body vibration sound to an object that is in contact with the panel.

CITATION LIST

Patent Literatures

PTL 1: JP2005348193A
PTL 2: JP5255142B1

SUMMARY

Technical Problem

The electronic devices described in Patent Literatures 1 and 2 are not designed to address the possibility that the piezoelectric element included in the vibration body will be deformed excessively and that external force will be applied to the piezoelectric element.

The present disclosure is to provide a unit, an electronic device, and a method of manufacturing the electronic device, all of which are capable of preventing excessive deformation of the piezoelectric element and preventing damage to the piezoelectric element caused by external force.

Solution to Problem

One aspect of the present disclosure resides in a unit, including: a panel; a piezoelectric element attached to the panel; and a substrate attached to a main surface of the piezoelectric element, wherein the panel is configured to be vibrated by the piezoelectric element, and sound is transmitted by the panel vibrating a part of a human body that is in contact with the deformed panel, the substrate includes a base made of resin and at least one signal line laminated with the base and connected to the main surface of the piezoelectric element, and substantially the entire main surface of the piezoelectric element is covered by the base.

Another aspect of the present disclosure resides in an electronic device, including at least the unit.

Yet another aspect of the present disclosure resides in an electronic device, including: a housing; a panel attached to the housing; a piezoelectric element attached to the panel, wherein the panel is configured to be deformed due to deformation of the piezoelectric element, and human-body vibration sound is transmitted to an object that is in contact with the deformed panel; and a protective member attached to a surface of the piezoelectric element that opposes to another surface of the piezoelectric element attached to the panel, wherein a surface of the protective member that opposes to another surface of the protective member attached to the piezoelectric element has a convex curved shape.

In one of preferred embodiments, the protective member covers both the surface of the piezoelectric element that is attached with the protective member and side surfaces extending from the surface of the piezoelectric element that is attached with the protective member.

Yet another aspect of the present disclosure resides in an electronic device, including: a housing; a piezoelectric element; a panel attached to the housing; an intermediate member disposed between the panel and the piezoelectric element, wherein the panel is configured to be deformed due to deformation of the piezoelectric element, and human-body vibration sound is transmitted to an object that is in contact with the deformed panel, and the piezoelectric element is attached to the intermediate member; and a protective member attached to a surface of the piezoelectric element that opposes to another surface of the piezoelectric element attached to the intermediate member, wherein a surface of the protective member that opposes to another surface of the protective member attached to the piezoelectric element has a convex curved shape.

In one of preferred embodiments, the protective member covers both the surface of the piezoelectric element that is attached with the protective member and side surfaces extending from the surface of the piezoelectric element that is attached with the protective member.

In one of preferred embodiments, an area of a surface of the intermediate member that is attached with the piezoelectric element is larger than an area of the other surface of the piezoelectric element that is attached to the intermediate member.

In one of preferred embodiments, the intermediate member is attached to the panel and the piezoelectric element by a joining member, and a surface of the intermediate member that is attached with the panel or the piezoelectric element is provided with a groove.

Yet another aspect of the present disclosure resides in an electronic device, including: a housing; a panel attached to the housing; a piezoelectric element attached to the panel, wherein the panel is configured to be deformed due to deformation of the piezoelectric element, and human-body vibration sound is transmitted to an object that is in contact with the deformed panel; and a cover member including a wall surface portion surrounding the piezoelectric element and a top surface portion extending from the wall surface portion, wherein the cover member is attached to the panel, and the piezoelectric element is disposed in space defined by the panel and the cover member.

In one of preferred embodiments, the space is filled with curable resin.

Yet another aspect of the present disclosure resides in a method of manufacturing an electronic device including: a housing; a panel attached to the housing; a piezoelectric element attached to the panel; and a frame member surrounding the piezoelectric element, wherein the panel is configured to be deformed due to deformation of the piezoelectric element, and human-body vibration sound is transmitted to an object that is in contact with the deformed panel. The method includes the step of: covering a surface of the piezoelectric element that opposes to another surface of the piezoelectric element attached to the panel with curable resin, by attaching the frame member to the panel and pouring the curable resin into a substantially box-shaped mold defined by the panel and an inner wall surface of the frame member and curing the curable resin.

Yet another aspect of the present disclosure resides in a method of manufacturing an electronic device including: a housing; a panel attached to the housing; a frame member including a wall surface portion surrounding the piezoelectric element and a bottom surface portion extending from the wall surface portion; and a piezoelectric element attached to the frame member, wherein the panel is configured to be deformed due to deformation of the piezoelectric element, and human-body vibration sound is transmitted to an object that is in contact with the deformed panel. The method includes the step of: covering a surface of the piezoelectric element that opposes to another surface of the piezoelectric element attached to the frame member with curable resin, by pouring the curable resin into a substantially box-shaped mold defined by the wall surface portion and the bottom surface portion of the frame member and curing the curable resin.

In one of preferred embodiments, an edge area of the bottom surface portion is attached to the panel by a first joining member, and the bottom surface portion is provided, in at least a part thereof, with a through hole through which the curable resin is filled to space defined between the panel and the bottom surface portion.

Yet another aspect of the present disclosure resides in a unit, including: a piezoelectric element; and a protective member attached to a predetermined surface of the piezoelectric element, wherein when another surface of the piezoelectric element that is different from the predetermined surface of the piezoelectric element is attached to a predetermined plate-shaped member, the plate-shaped member is deformed due to deformation of the piezoelectric element, and human-body vibration sound is transmitted to an object that is in contact with the deformed plate-shaped member, and a surface of the protective member that opposes to another surface of the protective member attached to the piezoelectric element has a convex curved shape.

Yet another aspect of the present disclosure resides in a unit, including: a first plate-shaped member; and a piezoelectric element attached to the first plate-shaped member, wherein, when a surface of the first plate-shaped member that opposes to another surface of the first plate-shaped member attached with the piezoelectric element is attached to a second plate-shaped member that is different from the first plate-shaped member, the second plate-shaped member is deformed due to deformation of the piezoelectric element, and human-body vibration sound is transmitted to an object that is in contact with the deformed second plate-shaped member; and a protective member attached to a surface of the piezoelectric element that opposes to another surface of the piezoelectric element attached to the first plate-shaped member, wherein a surface of the protective member that opposes to another surface of the protective member attached to the piezoelectric element has a convex curved shape.

Yet another aspect of the present disclosure resides in a unit, including: a box-shaped member; and a piezoelectric element attached to a bottom surface portion on an inner side of the box-shaped member, wherein when a surface at bottom of the box-shaped member that opposes to another surface at bottom of the box-shaped member attached with the piezoelectric element is attached to a predetermined plate-shaped member, the plate-shaped member is deformed due to deformation of the piezoelectric element, and human-body vibration sound is transmitted to an object that is in contact with the deformed plate-shaped member, and at least a part of the piezoelectric element is covered by curable resin that has been poured into the box-shaped member and cured.

Yet another aspect of the present disclosure resides in an electronic device, including: a panel; a piezoelectric element; a housing to which the panel is attached; and an intermediate member attached to the panel and the piezoelectric element and disposed between the piezoelectric element and the panel, wherein the panel is configured to be deformed due to deformation of the piezoelectric element, and human-body vibration sound is transmitted to an object that is in contact with the deformed panel, and in a predetermined area of the intermediate member that includes at least an area located right below the piezoelectric element in a direction in which the panel, the intermediate member, and the piezoelectric element are laminated, the intermediate member is attached to the panel by a first joining member, and in at least a part of a periphery of the predetermined area, the intermediate member is attached to the panel by a second joining member that is more flexible than the first joining member.

In one of preferred embodiments, the intermediate member is attached to one end side of the panel, and the second joining member is disposed on an opposite side to the one end side of the panel in an area over which the intermediate member is attached to the panel.

In one of preferred embodiments, the first joining member includes a curable resin.

In one of preferred embodiments, the second joining member includes a double-sided adhesive tape.

In one of preferred embodiments, the electronic device further includes a protective member attached to a surface of the piezoelectric element that opposes to another surface of the piezoelectric element attached to the intermediate member, wherein a surface of the protective member that opposes to another surface of the protective member attached to the piezoelectric element has a convex curved shape.

In one of preferred embodiments, the protective member covers both the surface of the piezoelectric element that is attached with the protective member and side surfaces extending from the surface of the piezoelectric element that is attached with the protective member.

In one of preferred embodiments, a surface of the intermediate member that is attached with the panel or the piezoelectric element is provided with a groove.

Yet another aspect of the present disclosure resides in a method of manufacturing an electronic device including: a panel; a piezoelectric element; a housing to which the panel is attached; an intermediate member attached to the panel and the piezoelectric element and disposed between the piezoelectric element and the panel; and a joining member used to attach the intermediate member to the panel, wherein the panel is configured to be deformed due to deformation of the piezoelectric element, and human-body vibration sound is transmitted to an object that is in contact with the deformed panel, space is defined between the panel, the intermediate member, and the joining member, and the space is provided with a first hole through which the space communicates with outside of the space. The method includes the step of: filling curable resin to the space from the first hole.

In one of preferred embodiments, the space is further provided with a second hole through which the space communicates with the outside, the second hole being different from the first hole, and an adhesive agent is filled to the space through the first hole, and air that is present in the space is expelled to the outside through the second hole.

In one of preferred embodiments, the piezoelectric element has a rectangular shape, the joining member is attached to both edge portions of a predetermined surface of the piezoelectric element along a longitudinal direction thereof, the space has a substantially rectangular shape, the first hole is provided on one end of the space in the longitudinal direction, and the second hole is provided on another end opposing to the one end of the space in the longitudinal direction.

In one of preferred embodiments, the intermediate member includes a bottom surface portion to which the piezoelectric element is attached and a wall surface portion standing from the bottom surface portion, and the curable resin is poured into box-shaped inner space defined by the bottom surface portion and the wall surface portion and cured, and a surface of the piezoelectric element that opposes to another surface of the piezoelectric element attached to the intermediate member is covered by the curable resin.

Yet another aspect of the present disclosure resides in a unit, including: a first plate-shaped member; and a piezoelectric element attached to the first plate-shaped member, wherein when a surface of the first plate-shaped member that opposes to another surface of the first plate-shaped member attached with the piezoelectric element is attached to a second plate-shaped member that is different from the first plate-shaped member, the second plate-shaped member is deformed due to deformation of the piezoelectric element, and human-body vibration sound is transmitted to an object that is in contact with the deformed second plate-shaped member, and in a predetermined area that includes at least an area located right below the piezoelectric element in a direction in which the piezoelectric element and the first plate-shaped member are laminated, the piezoelectric element is attached to the first plate-shaped member by a first joining member, and in at least a part of a periphery of the predetermined area, the piezoelectric element is attached to the first plate-shaped member by a second joining member that is more flexible than the first joining member.

Yet another aspect of the present disclosure resides in a unit, including: a box-shaped member; and a piezoelectric element attached to a bottom surface portion on an inner side of the box-shaped member, wherein when a surface at bottom of the box-shaped member that opposes to another surface at bottom of the box-shaped member attached with the piezoelectric element is attached to a predetermined plate-shaped member, the plate-shaped member is deformed due to deformation of the piezoelectric element, and human-body vibration sound is transmitted to an object that is in contact with the deformed plate-shaped member, and in a predetermined area that includes at least an area located right below the piezoelectric element in a direction in which the piezoelectric element and the bottom surface portion of the box-shaped member are laminated, the piezoelectric element is attached to the box-shaped member by a first joining member, and in at least a part of a periphery of the predetermined area, the piezoelectric element is attached to the box-shaped member by a second joining member that is more flexible than the first joining member.

In one of preferred embodiments, the unit further includes a protective member attached to a surface of the piezoelectric element that opposes to another surface of the piezoelectric element attached to the panel.

In one of preferred embodiments, a surface of the protective member that opposes to another surface of the protective member attached to the piezoelectric element has a convex curved shape.

Advantageous Effect

The present disclosure provides a unit, an electronic device, and a method of manufacturing the electronic device, all of which are capable of preventing excessive deformation of the piezoelectric element and preventing damage to the piezoelectric element caused by external force.

BRIEF DESCRIPTION OF THE DRAWINGS

In the accompanying drawings:

FIGS. 3A to 3B illustrate a housing configuration of an electronic device according to the first embodiment;

FIGS. 17A to 17E illustrate the first modification of the third embodiment of the present disclosure;

FIGS. 18A to 18C illustrate the second modification of the third embodiment of the present disclosure;

FIGS. 20A to 20E illustrate the fourth modification of the third embodiment of the present disclosure;

FIGS. 21A to 21E illustrate the fifth modification of the third embodiment of the present disclosure;

FIGS. 24A to 24E illustrate a configuration of an electronic device according to the fourth embodiment in detail;

FIGS. 25A to 25E illustrate the first modification of the fourth embodiment of the present disclosure;

FIGS. 26A to 26C illustrate the second modification of the fourth embodiment of the present disclosure;

DETAILED DESCRIPTION

Figure 1:
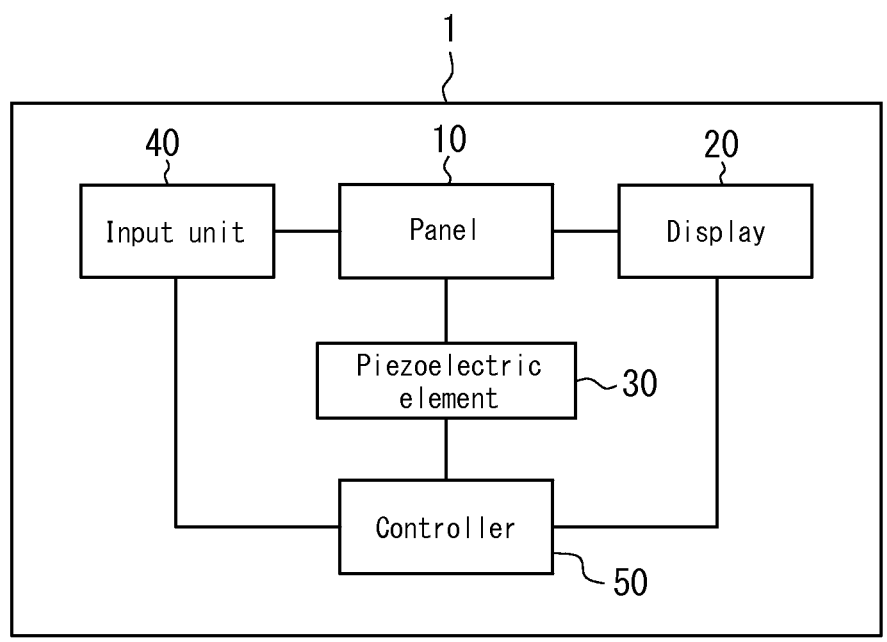
FIG. 1 is a function block diagram of an electronic device according to one of embodiments of the present disclosure.

Preferred embodiments of the present disclosure will be described below with reference to the accompanying drawings. FIG. 1 is a function block diagram of an electronic device 1 according to one of embodiments of the present disclosure. The electronic device 1, which may be a mobile phone (e.g., a smartphone), includes a panel 10 (as one example of a mounting member), a display 20, a piezoelectric element 30, an input unit 40, and a controller 50.

The panel 10 may be a touch panel that is configured to detect a contact or a cover panel that protects the display 20. The panel 10 may be made of, for example, glass, a synthetic resin such as acryl, and sapphire. Sapphire herein refers to a crystallized form of aluminum oxide ($Al_2O_3$) manufactured commercially. The panel 10 may have a flat plate shape or a curved shape. The panel having a curved shape may include the one having a concave shape dented in a middle portion on a surface forming an outer side of the electronic device 1 and also having a flat shape on a surface forming an inner side of the electronic device 1. Such a panel provides good usability because the concave surface of the panel fits easily to the temple of a user when the user presses the electronic device 1 against the temple to make a call. On the other hand, the surface of the panel 10 that is located on the inner side of the electronic device 1 is flat, and accordingly, even a non-flexible plate-shaped display 20 may be easily attached to the panel 10. The panel 10 preferably has a plate shape. The panel 10 may be a flat plate or a curved panel having a gradually inclined surface. When the panel 10 is a touch panel, the panel 10 detects a contact made by a finger of a user, a pen, a stylus pen, or the like. The touch panel may detect a contact using any type, such as a capacitive type, a resistive film type, a surface acoustic wave type (or an ultrasonic type), an infrared type, an electromagnetic induction type, and a load detection type.

The display 20 is a display device such as a liquid crystal display, an organic EL display, and an inorganic EL display. The display 20 may be a flexible display. The display 20 is disposed on the back surface of the panel 10. The display 20 may be disposed on the back surface of the panel 10 by using a joining member (e.g., an adhesive agent). The display 20 may also be supported by the housing of the electronic device 1 in a manner such that the display 20 is spaced apart from the panel 10. Alternatively, in a preferred embodiment, the display 20 may be joined to the back surface of the panel 10 by a joining member (e.g., an adhesive agent). The joining member may be an elastic resin, such as an optical elastic resin, with a controlled refractive index for light transmitted therethrough. The display 20 displays various information through the joining member and the panel 10.

The piezoelectric element 30 is an element that is configured to undergo expansion and contraction or bending (flexure) in accordance with an electromechanical coupling factor of a constituent material in response to an electric signal (voltage) applied thereto. As a material of the element, ceramic, crystal, and so forth may be used. The piezoelectric element 30 may be a unimorph, a bimorph, or a laminated-type piezoelectric element. The laminated-type piezoelectric element includes a laminated-type unimorph element in which (e.g., 16 or 24 layers of) unimorph are laminated or a laminated-type bimorph element in which (e.g., 16 or 24 layers of) bimorph are laminated. The laminated-type piezoelectric element is configured, for example, by a laminated structure of a plurality of dielectric layers made of lead zirconate titanate (PZT) and electrode layers each disposed between adjacent ones of the dielectric layers. The laminated-type piezoelectric element is bent and displaced in a direction in which the layers are laminated, namely, in the thickness direction, in response to an electric signal (voltage) applied thereto. Unimorph undergoes expansion and contraction in response to an electric signal (voltage) applied thereto, and bimorph undergoes bending in response to an electric signal (voltage) applied thereto.

The piezoelectric element 30 is disposed on the back surface of the panel 10 (a surface of an inner side of the electronic device 1). The piezoelectric element 30 is attached to the panel 10 by a joining member (e.g., a double-sided adhesive tape). The piezoelectric element 30 may also be attached to the panel 10 via an intermediate member (e.g., a sheet metal). The piezoelectric element 30 is at a predetermined distance from a surface of an inner side of a housing 60 in a state where the piezoelectric element 30 is disposed on the back surface of the panel 10. Preferably, the piezoelectric element 30 remains at a predetermined distance from the surface of the inner side of the housing 60 even in a state where the piezoelectric element 30 undergoes expansion and contraction or flexure. That is to say, the distance between the piezoelectric element 30 and the surface of the inner side of the housing 60 is preferably greater than a maximum amount of deformation of the piezoelectric element 30.

The input unit 40 is configured to receive an operation input from the user and is configured by, for example, an operation button (an operation key). When the panel 10 is the touch panel, the panel 10 is also capable of receiving an operation input from the user by detecting a contact made by the user.

The controller 50 is a processor configured to control the electronic device 1. The control unit 50 applies, to the piezoelectric element 30, a predetermined electric signal (voltage corresponding to a sound signal). When the control unit 50 applies an electric signal to the piezoelectric element 30, the piezoelectric element 30 is bent and displaced in the thickness direction. At this time, the panel 10 attached with the piezoelectric element 30 is deformed in conjunction with displacement of the piezoelectric element 30, thus resulting in the vibration of the panel 10. The panel 10 thus generates air conduction sound. The panel 10 also transmits human-body vibration sound to an object that is in contact with the panel 10. Examples of the object include a part of a user's body (e.g., a cartilaginous portion of an external ear). For example, the control unit 50 may apply, to the piezoelectric element 30, an electric signal corresponding to a sound signal representing voice of the party on the phone, to generate air conduction sound and human-body vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like over the network. The voltage that the control unit 50 applies to the piezoelectric element 30 may be ±15 V which is greater than ±5 V, that is, a voltage to be applied to a so-called panel speaker configured for sound conduction not using human-body vibration sound but using air conduction sound. With the above configuration, even when the user forcefully presses the panel 10 against a user's body with force greater than or equal to 3 N or so (e.g., force ranging from 5 N to 10 N), the piezoelectric element 30 causes vibration of the panel 10. As a result, human-body vibration sound which is transmitted through a part of the user's body is generated. Note that an amount of the application voltage is appropriately adjustable according to how tightly the panel 10 is fixed to the housing or a supporting member or according to a capability of the piezoelectric element 30. When the control unit 50 applies an electric signal to the piezoelectric element 30, the piezoelectric element 30 undergoes expansion and contraction or flexure in the longitudinal direction. At this time, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" refers to a state in which the panel is bent directly by expansion and contraction or bending (flexure) of the piezoelectric element via the joining member or via the joining member and a reinforcing member 80 which is later described. Thus, the panel 10 generates air conduction sound, and the panel 10 also generates human-body vibration sound that is transmitted through a part of the body when the user places the part of the body (e.g., the cartilaginous portion of the external ear) in contact with the panel 10. For example, the control unit 50 may apply, to the piezoelectric element 30, an electric signal corresponding to a sound signal representing voice of the party on the phone or the like, to generate air conduction sound and human-body vibration sound that correspond to the sound signal. The sound signal may represent a phone melody, music including a tune, or the like. The sound signal according to the electric signal may be based on music data stored in an internal memory of the electronic device 1 or may be reproduced according to music data stored in an external server and the like over the network.

The vibration is caused in an area of the panel 10 where the piezoelectric element 30 is disposed and in other areas of the panel 10 that are away from the area where the piezoelectric element 30 is disposed. The panel 10 includes, in the areas vibrated, a plurality of portions that is configured to vibrate in a direction intersecting with a main surface of the panel 10, and in each of the plurality of portions, a value indicating an amplitude of the vibration transitions over time from plus to minus or vice versa. The panel 10 is vibrated in a manner such that areas with relatively large amplitude of vibration and areas with relatively small amplitude of vibration are seemingly distributed randomly across the panel 10 at a certain moment. In other words, the vibration of a plurality of wavelengths is detected across all areas of the panel 10. In order to prevent the aforementioned vibration of the panel 10 from being attenuated even when the user forcefully presses the panel 10 against the user's body with force ranging, for example, from 5 N to 10 N, the voltage that the control unit 50 applies to the piezoelectric element 30 may be ±15 V. The above configuration allows the user to listen to sound while placing the ear in contact with the areas of the panel 10 that are away from the area where the piezoelectric element 30 is disposed.

Figure 2:
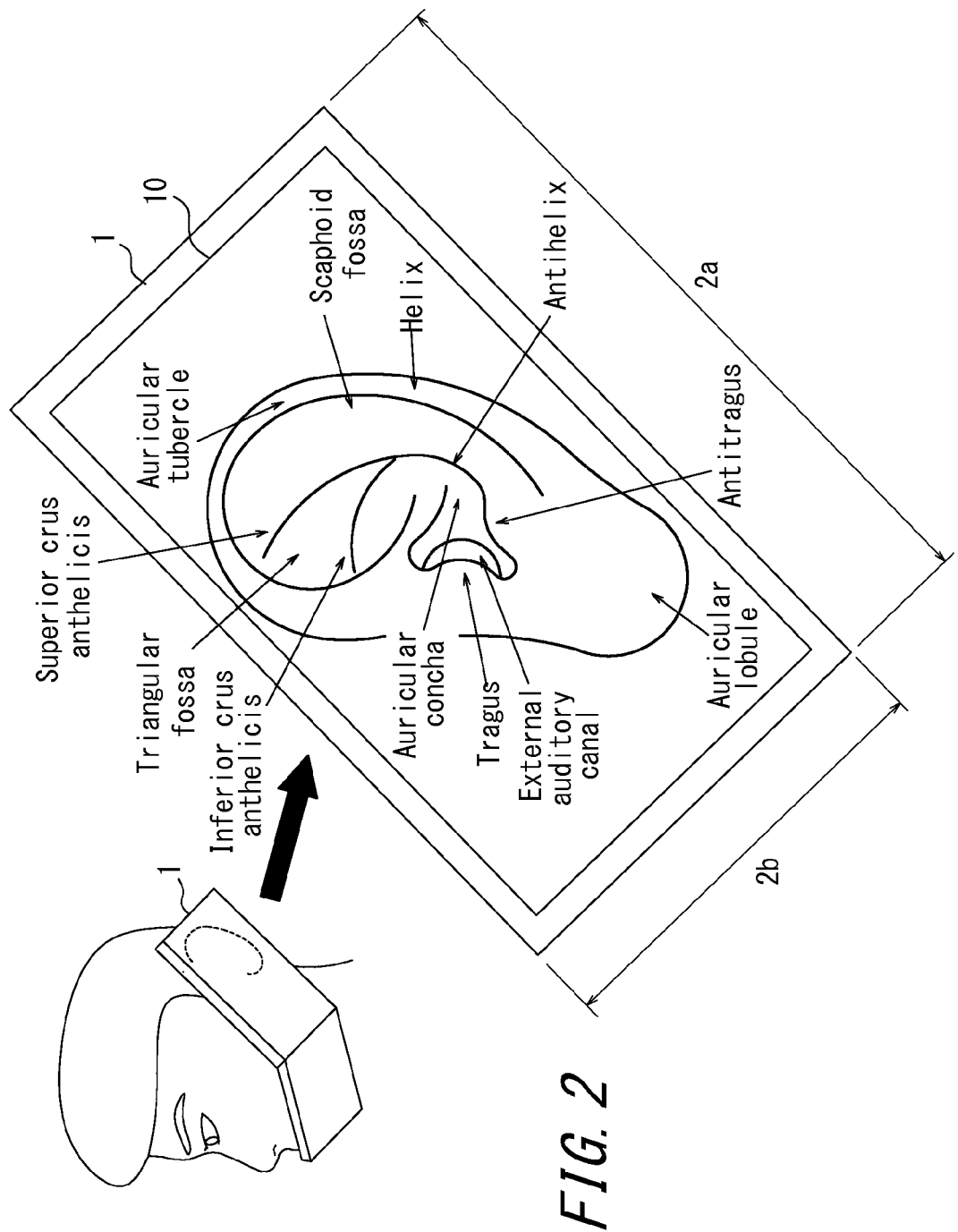
FIG. 2 illustrates a preferable shape of a panel.

The panel 10 may be substantially as large as the user's ear. As illustrated in FIG. 2, the panel 10 may also be larger than the user's ear. In this case, when the user listens to sound, the whole ear tends to be covered by the panel 10 of the electronic device 1. As a result, ambient sound (noise) is prevented from entering through an external auditory canal. It is suffice for the vibration to occur in an area of the panel 10 that is larger than an area having a length corresponding to a distance from an inferior crus of antihelix (i.e., an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e., a superior crus anthelicis) to an auricular lobule and a width corresponding to a distance from the tragus to a portion of the helix that is near the antihelix. A length direction herein refers to a longitudinal direction 2a along which the panel 10 extends, and the piezoelectric element 30 is disposed closer to one end portion relative to a middle of the panel 10 in the longitudinal direction 2a. A width direction refers to a direction 2b intersecting with the longitudinal direction. The areas having the above lengths and widths may have an oblong shape or an elliptical shape with as a major axis corresponding to the length and a minor axis corresponding to the width. Average ear size of the Japanese may be seen from, for example, the Japanese Body Dimension Database (1992-1994) distributed by the Research Institute of Human Engineering for Quality Life (HQL). The panel 10 with a size greater than the average ear size of the Japanese would be generally capable of covering a whole ear of a foreigner as well.

With the aforementioned dimension and shape, the panel 10 is capable of covering the user's ear, which offers tolerance to misalignment when the user presses the panel 10 to the ear.

The above electronic device 1 is capable of transmitting, to the user, air conduction sound and human-body vibration sound, which is transmitted through a part of the user's body (e.g., the cartilaginous portion of the external ear), by the vibration of the panel 10. Accordingly, when the panel 10 outputs sound at substantially the same volume level as an existing dynamic receiver, less amount of sound propagates to an external environment of the electronic device 1 due to the vibration of air resulting from the vibration of the panel 10, compared to cases of the dynamic receiver. Accordingly, the electronic device 1 is well-suited for a situation where a recorded message is listened to on the train and the like, for example.

The electronic device 1 generates sound which is transmitted to an inner part of the human body by the vibration of the panel 10 generated by the piezoelectric element 30. The sound to be transmitted to an inner part of the human body passes through a soft tissue of the human body (e.g., the cartilage) to vibrate a middle ear or an inner ear. The above electronic device 1 transmits human-body vibration sound by the vibration of the panel 10. Furthermore, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in cases where the electronic device 1 is not provided with an additional dynamic receiver, it is not necessary to provide the housing with an opening (i.e., a sound discharge opening) for sound transmission. As a result, the waterproof structure of the electronic device is simplified. When the electronic device 1 is provided with a dynamic receiver, the sound discharge opening may be closed by a member that passes air through and blocks liquid. The member that passes air through and blocks liquid may be Gore-Tex™.

First Embodiment

FIGS. 3A to 3B illustrate a housing configuration of the electronic device 1 according to the first embodiment. FIG. 3A is a front view, and FIG. 3B is a sectional view taken along a line b-b of FIG. 3A. The electronic device 1 illustrated in FIGS. 3A and 3B is a smartphone in which a touch panel, i.e., a glass plate, is mounted as the panel 10 on a front surface of a housing 60 (e.g., a metal or a resin casing). The panel 10 and the input unit 40 are supported by the housing 60, and the display 20 and the piezoelectric element 30 are each adhered to the panel 10 by a joining member 70. The joining member 70 may an adhesive agent, a double-sided adhesive tape, or the like having thermosetting properties, ultraviolet-curable properties, or the like. For example, the joining member 70 may be an optical elastic resin, which is a colorless and transparent ultraviolet-curable acrylic adhesive agent. The panel 10, the display 20, and the piezoelectric element 30 each have a substantially rectangular shape.

The display 20 is disposed in substantially a middle of the panel 10 in a short-side direction thereof. The piezoelectric element 30 is disposed near an end portion of the panel 10 in the longitudinal direction of the panel 10 at a predetermined distance from the end portion in a manner such that the longitudinal direction of the piezoelectric element 30 extends along a short side of the panel 10. The display 20 and the piezoelectric element 30 are disposed side by side in a direction parallel to a surface of an inner side of the panel 10.

A description is given of a configuration in the vicinity of the piezoelectric element 30 of the electronic device 1 according to the first embodiment with reference to FIGS. 4 to 9. As illustrated in FIGS. 4 to 9, a Flexible Printed Circuit (FPC) 25 is connected to the piezoelectric element 30. The FPC 25 conveys an electric signal applied from the controller 50 to the piezoelectric element 30. In other words, an electric signal from the controller 50 is conveyed to the piezoelectric element 30 via the FPC 25.

The FPC 25 includes a base 25a, signal lines 25b and 25c, and a cover lay 25d that are laminated in the stated order. The base 25a and the cover lay 25d are formed by using resin, such as polyimide. The base 25a is a base of the FPC 25 and is one example of a resin member. The signals 25b and 25c are formed by using, for example, copper foil or bronze foil. The base 25a and the signal lines 25b and 25c are adhered by using an adhesive agent, such as thermosetting resin (which is not illustrated), and the signal lines 25b and 25c and the cover lay 25d are similarly adhered.

Figure 4:
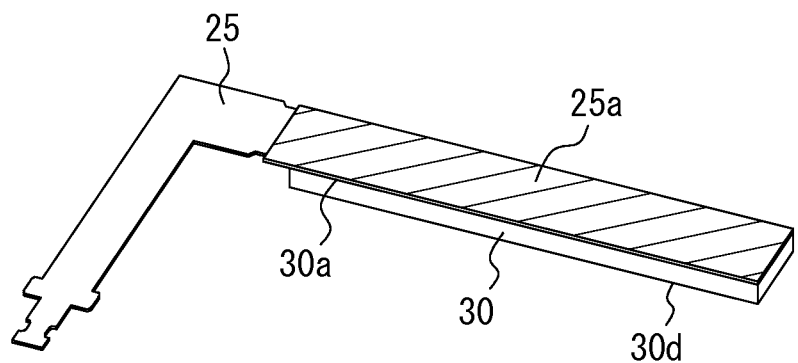
FIG. 4 is a perspective view illustrating a state in which a FPC and a piezoelectric element are connected.
Figure 5:
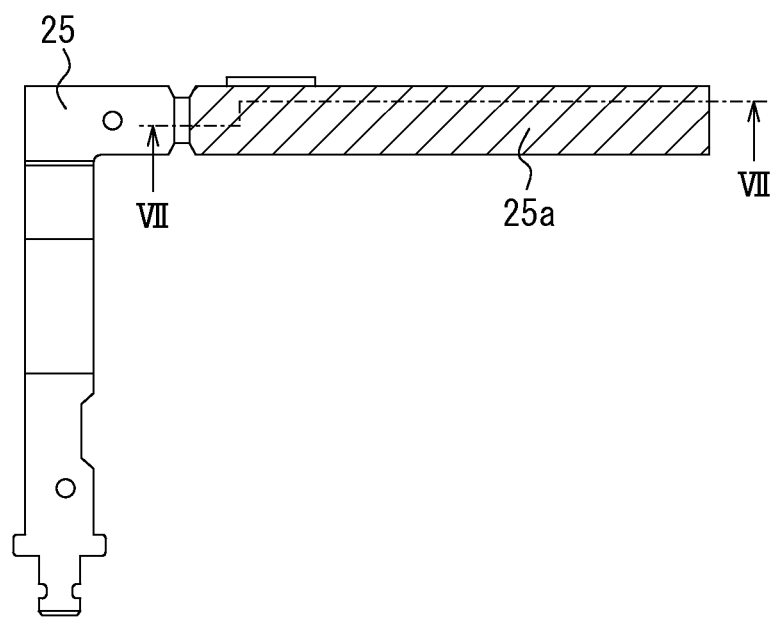
FIG. 5 illustrates the FPC and the piezoelectric element of FIG. 4 in a thickness direction of the FPC or the piezoelectric element.

FIG. 4 is a perspective view illustrating a state in which the FPC 25 and the piezoelectric element 30 are connected. FIG. 5 illustrates the FPC 25 and the piezoelectric element 30 of FIG. 4 in a thickness direction of the FPC 25 or the piezoelectric element 30. As illustrated in FIG. 4, the piezoelectric element 30 has a long shape. The piezoelectric element 30 has a flat plate shape. The piezoelectric element 30 includes the first main surface 30a and the second main surface 30d. The FPC 25 is electrically connected to the piezoelectric element 30 mainly in an end area of the first main surface 30a of the piezoelectric element 30 in the longitudinal direction. In FIG. 4, the FPC 25 is electrically connected to the piezoelectric element 30 in the end portion located on the left in the longitudinal direction of the piezoelectric element 30. A description is given later in detail about a connection configuration between the FPC 25 and the piezoelectric element 30.

In an area where the FPC 25 is connected to the piezoelectric element 30, the base 25a of the FPC 25 has a larger thickness than the remaining area of the base 25a. For example, an area of the base 25a that is not connected to the piezoelectric element 30 may have a thickness of approximately 0.03 mm, while an area of the base 25a that is located near the area connected to the piezoelectric element 30 may have a thickness of approximately 0.4 mm. The base 25a may also have the constant thickness in the area not connected to the piezoelectric element 30 and in the area located near the area connected to the piezoelectric element 30. By imparting a relatively large thickness to the area of the base 25a that is located near the area where the FPC 25 is connected to the piezoelectric element 30, separation of the FPC 25 and the piezoelectric element 30 is prevented when, for example, external force is applied to the connected areas of the FPC 25 and the piezoelectric element 30.

The area of the base 25a that has a relatively large thickness covers the first main surface 30a of the piezoelectric element 30. The area of the base 25a that has a relatively large thickness covers substantially the entire first main surface 30a of the piezoelectric element 30. The phrase "substantially the entire" or "the entire" first main surface 30a refers to, for example, 80 percent or more of the whole first main surface 30a. The above area of the base 25, which prevents damage to the piezoelectric element 30, does not need to cover the first main surface 30a completely. The area of the base 25a that has a relatively large thickness extends to an end portion of the piezoelectric element 30 that opposes to the area of the piezoelectric element 30 connected with the FPC 25 in the longitudinal direction of the piezoelectric element 30 (i.e., the end portion of the piezoelectric element 30 that is located on the right in the longitudinal direction in FIG. 4). The second main surface 30d of the piezoelectric element 30 is not covered by the base 25a, and the second main surface 30d is adhered to the panel 10 by using the joining member 70.

Figure 6A:
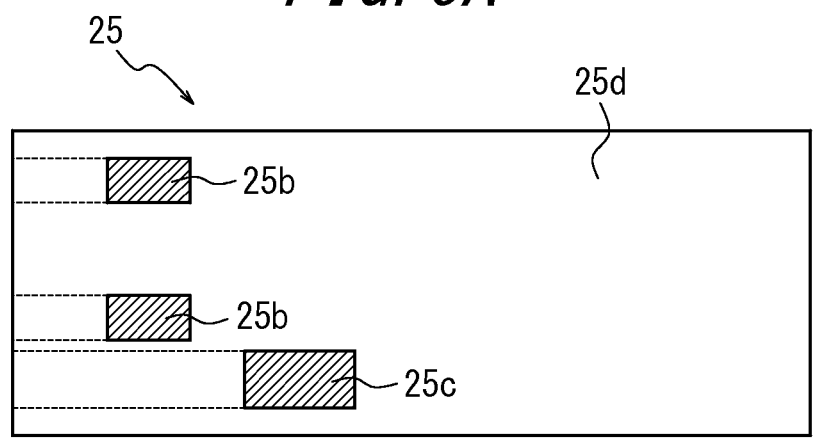
FIG. 6A illustrates an area of the FPC to be connected, as viewed from the side of a cover lay.
Figure 6B:
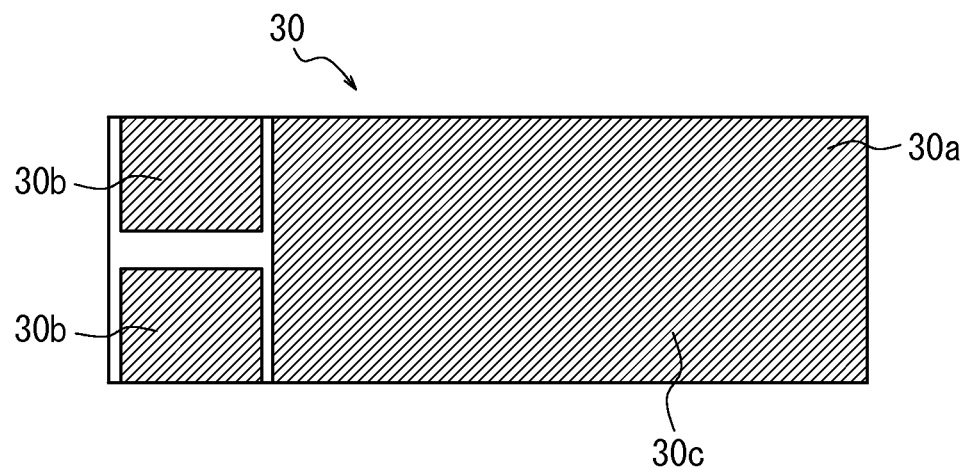
FIG. 6B illustrates an area of the piezoelectric element to be connected, as viewed from the side of the first main surface.

FIGS. 6A and 6B illustrate the areas of the FPC 25 and the piezoelectric element 30 where both are connected. FIG. 6A illustrates the area of the FPC 25 to be connected, as viewed from the side of the cover lay 25d. FIG. 6B illustrates the area of the piezoelectric element 30 to be connected, as viewed from the side of the first main surface 30a. As illustrated in FIG. 6A, in the area of the FPC 25 to be connected, a part of each of the signal lines 25b and 25c is exposed from the cover lay 25d. As illustrated in FIG. 6B, in the area of the piezoelectric element 30 that is to be connected, a plus electrode terminal 30b and a minus electrode terminal 30c are exposed from the first main surface 30a. For connection between the FPC 25 and the piezoelectric element 30, the signal line 25b of the FPC 25 is connected to the plus electrode terminal 30b of the piezoelectric element 30, and the signal line 25c of the FPC 25 is connected to the minus electrode terminal 30c of the piezoelectric element 30. The FPC 25 and the piezoelectric element 30 are adhered by a technique called Anisotropic Conductive Paste (ACP) connection or Anisotropic Conductive Film (ACF) connection which is later described.

Figure 7:
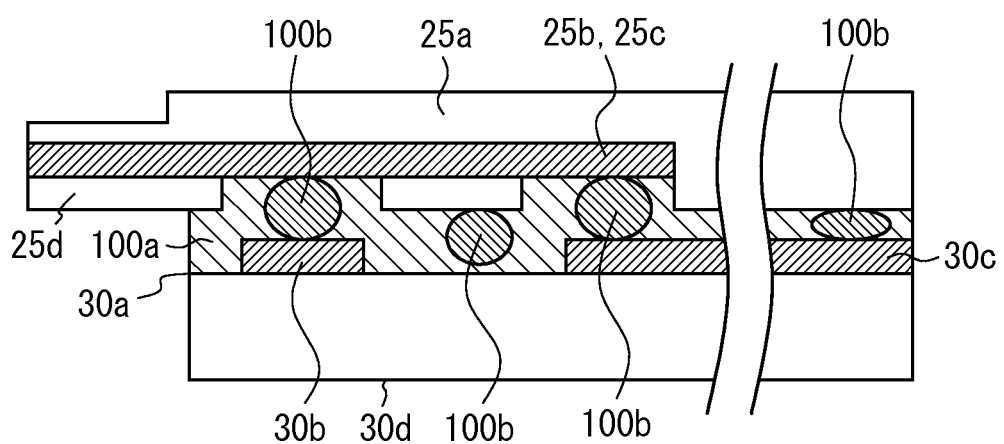
FIG. 7 illustrates the first example of connection configuration between a FPC and a piezoelectric element.
Figure 8:
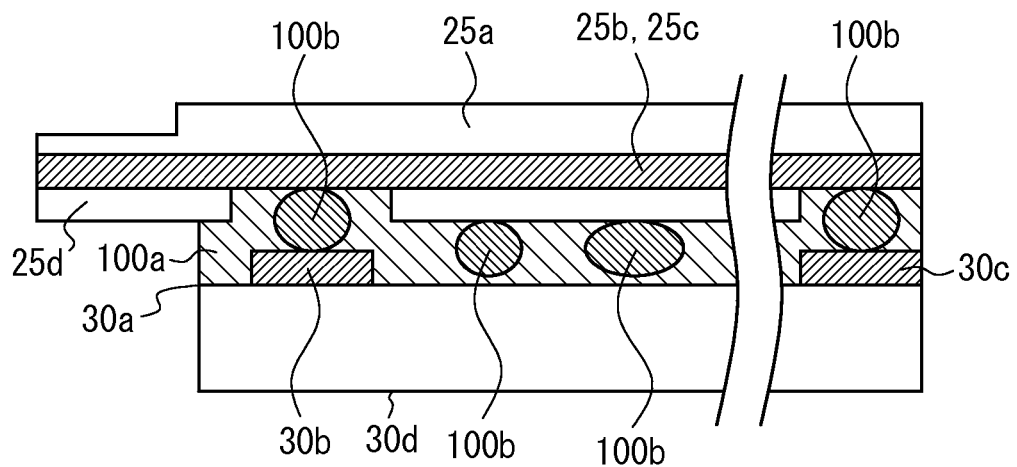
FIG. 8 illustrates the second example of connection configuration between a FPC and a piezoelectric element.

With reference to FIGS. 7 and 8, a description is given of a connection configuration between the FPC 25 and the piezoelectric element 30. FIG. 7 illustrates the first example of the connection configuration between the FPC 25 and the piezoelectric element 30. FIG. 8 illustrates the second example of the connection configuration between the FPC 25 and the piezoelectric element 30.

Firstly, with reference to FIG. 7, a description is given of the first example of the connection configuration, including the ACP connection or the ACF connection, between the FPC 25 and the piezoelectric element 30. The ACP connection or the ACF connection uses an anisotropic conductive material 100. The anisotropic conductive material 100 is composed mainly of a binder (an adhesive agent) in which conductive particles are mixed. The binder is a component used for mechanically fixing the areas to be connected, and the conductive particles are components serving to bring the opposing electrodes into electrical conduction. The binder is, for example, a synthetic rubber-based resin having thermosetting properties. The conductive particles include, for example, particles of resin, such as polystyrene, that are overlaid with gold. The conductive particles may also include metal cores, such as nickel, that are overlaid with gold, or metal cores per se.

The FPC 25 and the piezoelectric element 30 are connected by thermocompression bonding, during which these members are superposed with the aforementioned anisotropic conductive material 100 being disposed between the areas of the FPC 25 and the piezoelectric element 30 that are to be connected. FIG. 7 illustrates a state in which the FPC 25 and the piezoelectric element 30 have been connected by thermocompression bonding. FIG. 7 is a sectional view taken along a line VII-VII in FIG. 5. In FIG. 7, reference numeral 100a denotes the binder (adhesive agent), and reference numeral 100b denotes a conductive particle. As a result of the thermocompression bonding, the signal lines 25b and 25c of the FPC 25 are mechanically and electrically connected to the plus electrode terminal 30b and the minus electrode terminal 30c of the piezoelectric element 30 by the conductive particles 100b sandwiched therebetween. On the other hand, the binder, which is an insulator, maintains insulation between adjacent conductive particles 100b.

In FIG. 7, the plus electrode terminal 30b and the minus electrode terminal 30c of the piezoelectric element 30 are illustrated as electrically connected through the signal lines 25b and 25c of the FPC 25 and the conductive particles 100b. However, in practice, the signal lines 25b and 25c are disposed at a distance in a direction along the main surface of the piezoelectric element 30 (i.e., in a direction that is perpendicular to the sheet of FIG. 7) as illustrated in FIG. 6A, and the signal line 25b is connected to the plus electrode terminal 30b but not connected to the minus electrode terminal 30c. Similarly, the signal line 25c is connected to the minus electrode terminal 30c but not connected to the plus electrode terminal 30b.

The base 25a extends in the longitudinal direction of the piezoelectric element 30 from the vicinity of the area where the FPC 25 is connected to the piezoelectric element 30. The base 25a covers the first main surface 30a of the piezoelectric element 30.

In this way, according to the first example, substantially the entire first main surface 30a of the piezoelectric element 30 is covered by the base 25a made of, for example, resin such as polyimide. The above configuration prevents, when the electronic device 1 is dropped to the ground and the housing 60 is deformed, the deformed housing 60 from damaging the piezoelectric element 30 by colliding with the piezoelectric element 30. Furthermore, since the plus electrode 30b and the minus electrode 30c disposed on the first main surface 30a of the piezoelectric element 30 are covered by the insulative base 25a, when a metal member (e.g., a sheet metal member or the like that supports a circuit substrate or the display 20) is disposed in the vicinity of the piezoelectric element 30 in the housing 60, the metal member is brought into conduction with the piezoelectric element 30, and malfunction of the electronic device 1 is prevented.

Secondly, with reference to FIG. 8, a description is given of the second example of the connection configuration between the FPC 25 and the piezoelectric element 30. A description of a part of the configuration that is similar to the first example is omitted, and different features are mainly described below.

The second example of FIG. 8 differs from the first example of FIG. 7 in the connection configuration between the signal line 25c of the FPC 25 and the minus electrode terminal 30c of the piezoelectric element 30. As illustrated in FIG. 8, in the second example, the signal line 25c of the FPC 25 extends to the vicinity of the end portion of the piezoelectric element 30 that is located on the right in the longitudinal direction of the piezoelectric element 30 (i.e., in a left and right direction in FIGS. 7 and 8). Furthermore, the minus electrode terminal 30c is disposed in the vicinity of the end portion of the piezoelectric element 30 that is located on the right in the longitudinal direction thereof, and the minus electrode terminal 30c is not disposed in the vicinity of the middle portion of the piezoelectric element 30 in the longitudinal direction and in the vicinity of the plus electrode 30b. On the other hand, the plus electrode terminal 30b is disposed in the vicinity of the end portion of the piezoelectric element 30 that is located on the left in the longitudinal direction. That is to say, connection between the FPC 25 and the piezoelectric element 30 is achieved between the signal line 25b and the plus electrode terminal 30b on one end portion of the piezoelectric element 30 in the longitudinal direction thereof, and between the signal line 25c and the plus electrode 30c on the other end portion in the longitudinal direction. Additionally, in the vicinity of the middle portion of the piezoelectric element 30 in the longitudinal direction thereof, the cover lay 25d of the FPC 25 is located between the signal lines 25b and 25c and the piezoelectric element 30. Accordingly, the conductive particles 100b cannot bring the FPC 25 into undesired conduction with the piezoelectric element 30 in the vicinity of the middle portion of the piezoelectric element 30.

In this way, according to the second example, the plus electrode terminal 30b of the piezoelectric element 30 is disposed in the vicinity of one end portion in the longitudinal direction, and the minus electrode terminal 30c is located in the vicinity of the other end portion in the longitudinal direction. The above configuration prevents a short circuit between the plus electrode terminal 30b and the minus electrode terminal 30c due to the conductive particles 100b. Furthermore, compared with the first example of FIG. 7, an area of the first main surface 30a of the piezoelectric element 30 over which the minus electrode terminal 30c is disposed is reduced, and accordingly, flexure of the piezoelectric element 30 is facilitated.

Although in FIG. 8 the minus electrode terminal 30c is disposed only in the vicinity of the end portion of the piezoelectric element 30 that is located on the right in the longitudinal direction thereof and is not disposed in the vicinity of the middle portion of the piezoelectric element 30 in the longitudinal direction thereof and in the vicinity of the plus electrode terminal 30b, the present embodiment is not limited to this example. The minus electrode terminal 30c only needs to be disposed at a distance that is sufficient to prevent a short circuit between the minus electrode terminal 30c and the plus electrode terminal 30b due to the conductive particles 100b of the anisotropic conductive material, and the minus electrode terminal 30c may also be disposed in the vicinity of the middle portion of the piezoelectric element 30 in the longitudinal direction thereof and in the vicinity of the plus electrode terminal 30b.

Figure 9:
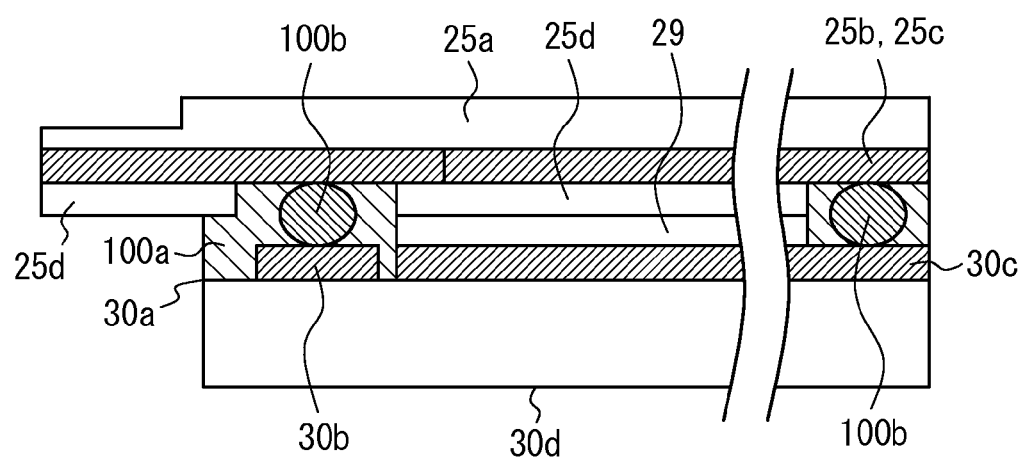
FIG. 9 illustrates the third example of connection configuration between a FPC and a piezoelectric element.

Thirdly, with reference to FIG. 9, a description is given of the third example of the connection configuration between the FPC 25 and the piezoelectric element 30. A description of a part of the configuration that is similar to the first and the second example is omitted, and different features are mainly described below.

The connection configuration between the FPC 25 and the piezoelectric element 30 in the third example of FIG. 9 is different in the vicinity of the middle portion of the piezoelectric element 30 in the longitudinal direction thereof. As illustrated in FIG. 9, connection between the FPC 25 and the piezoelectric element 30 is achieved between the signal line 25b and the plus electrode terminal 30b by the anisotropic conductive materials 100 on one end portion of the piezoelectric element 30 in the longitudinal direction thereof, and between the signal line 25c and the plus electrode terminal 30c by the anisotropic conductive materials 100 on the other end portion. Furthermore, a gap 29 is formed between the minus electrode terminal 30c and the cover lay 25d in the vicinity of the middle portion of the piezoelectric element 30 in the longitudinal direction thereof. That is to say, the minus electrode terminal 30c and the cover lay 25d are disposed at a predetermined distance.

In this way, according to the third example, the FPC 25 and the piezoelectric element 30 are connected on both the end portions of the piezoelectric element 30 in the longitudinal direction thereof and not connected in the vicinity of the middle portion of the piezoelectric element 30 in the longitudinal direction thereof. The above configuration prevents the FPC 25 from interfering with deformation of the piezoelectric element 30 while maintaining electrical conduction therebetween and thus allows the piezoelectric element 30 to vibrate the panel 10 efficiently. The piezoelectric element 30 is deformed in response to voltage applied thereto as described above, and a part of the FPC 25, such as a part of the FPC 25 that opposes to the vicinity of the middle portion of the piezoelectric element 30 in the longitudinal direction thereof, may be bent as long as the FPC 25 does not interfere with the deformation of the piezoelectric element 30. The phrase "substantially the entire first main surface 30a of the piezoelectric element 30 is covered by the FPC 25" herein encompasses both the configuration as illustrated in the first and the second example in which substantially the entire main surfaces of these elements are adhered by the anisotropic conductive material 100 and the configuration as illustrated in the third example in which these elements are connected only on both the end portions of the piezoelectric element 30 in the longitudinal direction thereof. In the gap 29, an elastic member, such as sponge, may be disposed.

Figure 10:
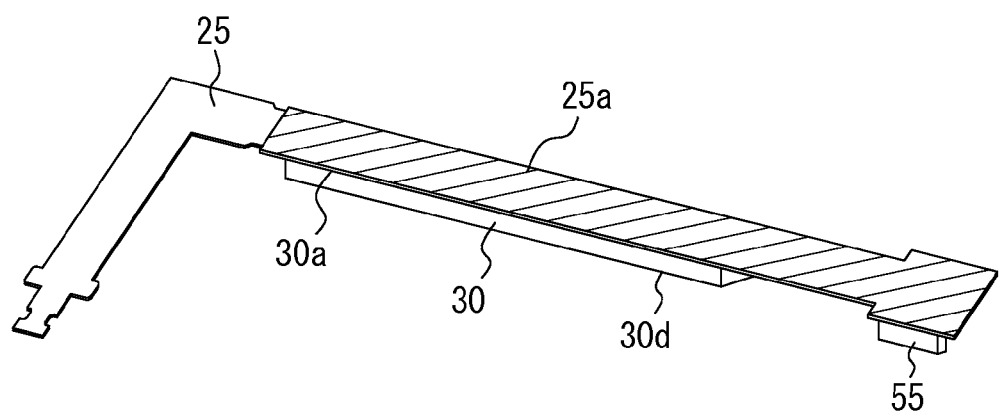
FIG. 10 illustrates a FPC and a piezoelectric element according to the first modification.

In the following, a description is given of the first modification of the electronic device 1 according to the present disclosure with reference to FIG. 10. FIG. 10 illustrates the FPC 25 and the piezoelectric element 30 according to the first modification. As illustrated in FIG. 10, the FPC 25 is connected to the piezoelectric element 30 similarly to the examples of FIGS. 7 and 8 and also connected to an electronic member 55. The FPC 25 extends further from an end portion of the piezoelectric element 30 in the longitudinal direction thereof. The electronic member 55 is connected with an end portion of the FPC 25. The electronic member 55 is, for example, a light intensity sensor, a proximity sensor, a camera, or an infrared communicator. The FPC 25 includes, in addition to the signal lines 25b and 25c that are connected to the piezoelectric element 30, a signal line connected to the electronic member 55.

By thus further extending the FPC 25 covering the entire first main surface 30a of the piezoelectric element 30 and disposing the electronic member 55 in the end of the extended portion (herein after, called "the extension"), the piezoelectric element 30 and the electronic member 55 are connected to a circuit substrate (which is not illustrated) by using the single FPC 25, and the number of elements is reduced. Additionally, the FPC 25 is also deformed due to deformation of the piezoelectric element 30, and the deformation of the FPC 25 might be propagated to the electronic member 55, thus vibrating the electronic member 55. In this case, the magnitude of the vibration of the electronic member 55 is reduced by covering the electronic member 55 with an elastic member, such as sponge. The extension of the FPC 25 may also be further extended to protect the extension against tension. In this case, vibration caused by the deformation of the FPC 25 is prevented from being propagated to the electronic member.

In the electronic device 1 described above, the second main surface 30d of the piezoelectric element 30 is adhered to the panel 10 by the joining member 70, and the first main surface 30a of the piezoelectric element 30 that opposes to the second main surface 30d is covered by the base 25a of the FPC 25. That is to say, the piezoelectric element 30 is disposed between the panel 10 and the FPC 25. However, the configuration of the electronic device 1 according to the present disclosure is not limited to this example.

Figure 11:
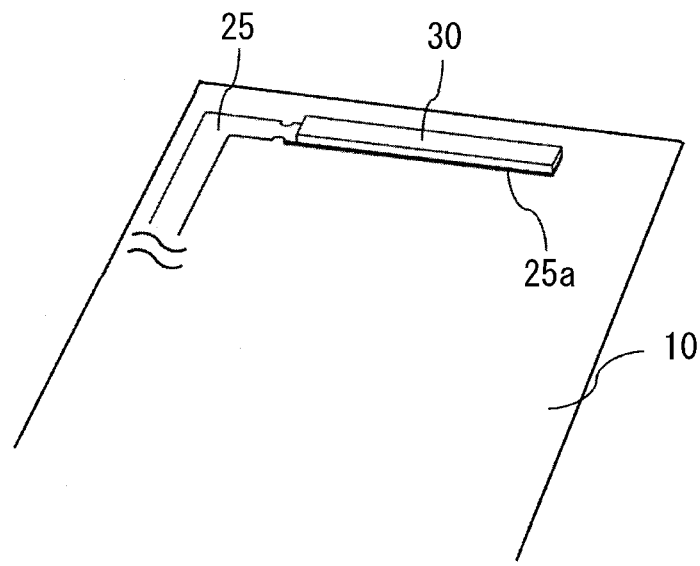
FIG. 11 illustrates a panel, a FPC, and a piezoelectric element according to the second modification.

With reference to FIG. 11, a description is given of the second modification of the electronic device 1. FIG. 11 illustrates the panel 10, the FPC 25, and the piezoelectric element 30 according to the second modification. In the present modification, the FPC 25 is disposed between the panel 10 and the piezoelectric element 30. For example, the base 25a of the FPC 25 is connected to the panel 10 by the joining member 70, and the cover lay 25d of the FPC 25 is connected to the piezoelectric element 30 by the aforementioned ACF connection.

In the present modification, the FPC 25, which includes the base made of resin such as polyimide, is disposed between the panel 10 and the piezoelectric element 30. The above configuration allows, when, for example, the electronic device 1 is dropped to the ground and the resulting external impact is propagated to the piezoelectric element 30 though the panel 10, the FPC 25 to mitigate the external impact, thus preventing damage to the piezoelectric element 30.

A surface of the piezoelectric element 30 that opposes to another surface of the piezoelectric element 30 attached to the FPC 25 is exposed in the inside of the electronic device 1. However, the exposed surface may also be covered by a protective member made of resin or the like. This configuration, similarly to the aforementioned example, prevents damage to the piezoelectric element 30 caused when the deformed housing 60 collides with the piezoelectric element 30 due to dropping of the electronic device 1.

Although the FPC 25 in the present modification is described as attached to the panel 10 by the joining member 70, the present modification is not limited to this example. The FPC 25 may also be attached to the panel 10 by the aforementioned ACF connection. In this case, the FPC 25 may further include a signal line other than the signal lines 25b and 25c connected to the piezoelectric element 30, and the further signal line may be connected to an electrode terminal provided in the panel 10. The above configuration allows an electric signal to be applied to not only the piezoelectric element 30 but also the panel 10 through the FPC 25.

The FPC 25 and the piezoelectric element 30 may also be connected by a solder member, not by the ACF connection.

The first example, the second example, and the modifications which have been described with reference to FIGS. 1 to 11 may be combined appropriately.

Figure 12:
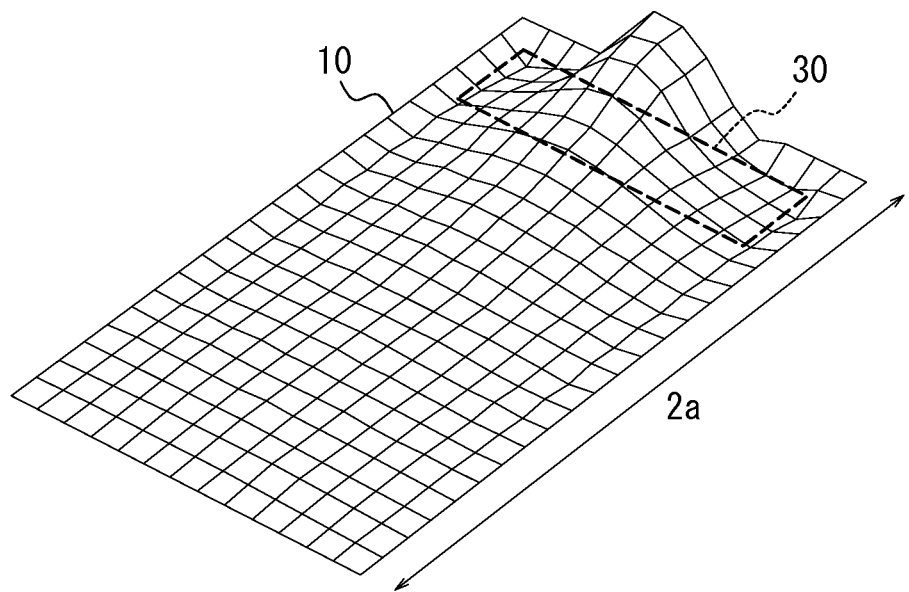
FIG. 12 illustrates one example of vibration of a panel of an electronic device according to the first embodiment.

FIG. 12 illustrates one example of the vibration of the panel 10 of the electronic device 1 according to the first embodiment. In the electronic device 1 according to the first embodiment, the display 20 is attached to the panel 10. Accordingly, the lower portion of the panel 10 is less likely to vibrate compared to the upper portion of the panel 10 attached with the piezoelectric element 30. As a result, in the lower portion of the panel 10, sound leakage due to the vibration occurring in the lower portion of the panel 10 is reduced. The panel 10 in the upper portion thereof is bent directly by the piezoelectric element 30, and the vibration in the lower portion is attenuated compared to the vibration in the upper portion. The panel 10 is bent by the piezoelectric element 30 in a manner such that a portion of the panel 10 directly above the piezoelectric element 30 protrudes relative to neighboring portions of the panel 10 in a long-side direction of the piezoelectric element 30. The panel 10 is also bent by the piezoelectric element 30 in a manner such that a portion of the panel 10 directly above the piezoelectric element 30 protrudes relative to neighboring portions of the panel 10 in a long-side direction of the panel 10.

As described above, according to the electronic device 1 of the present embodiment, the panel 10 is deformed due to deformation of the piezoelectric element 30 attached to the back surface of the panel 10, and air conduction sound and human-body vibration sound are transmitted to an object that is in contact with the deformed panel 10. In conjunction with the deformation of the piezoelectric element 30, the FPC 25 is also deformed. As a result, air conduction sound and human-body vibration sound are transmitted to the user without having to protrude the vibration body from an outer surface of the housing 60. Accordingly, usability of the electronic device is improved compared to such an electronic device as described in Patent Literature 1 (Japanese Patent Application Publication No. 2005-348193), by which the user places the vibration body, which is significantly small compared to the housing, in contact with the body. Furthermore, since there is no need for pressing the user's ear to the piezoelectric element itself, the piezoelectric element 30 itself is less likely to damage. Moreover, although the user tends to drop a terminal device while vibration is generated when the housing 60, not the panel 10, is deformed, vibrating the panel 10 makes it unlikely to occur.

The piezoelectric element 30 is joined to the panel 10 by the joining member 70. The above configuration allows attachment of the piezoelectric element 30 to the panel 10 without limiting flexibility of deformation of the piezoelectric element 30 significantly. The joining member 70 may be an adhesive agent that is not thermosetting. This provides an advantage that contraction due to a thermal stress is less likely to occur between the piezoelectric element 30 and the panel 10 during curing. The joining member 70 may also be a double-sided adhesive tape. This provides an advantage that a contraction stress, which often occurs when an adhesive agent is used, is less likely to be applied between the piezoelectric element 30 and the panel 10.

Second Embodiment

Figure 13A:
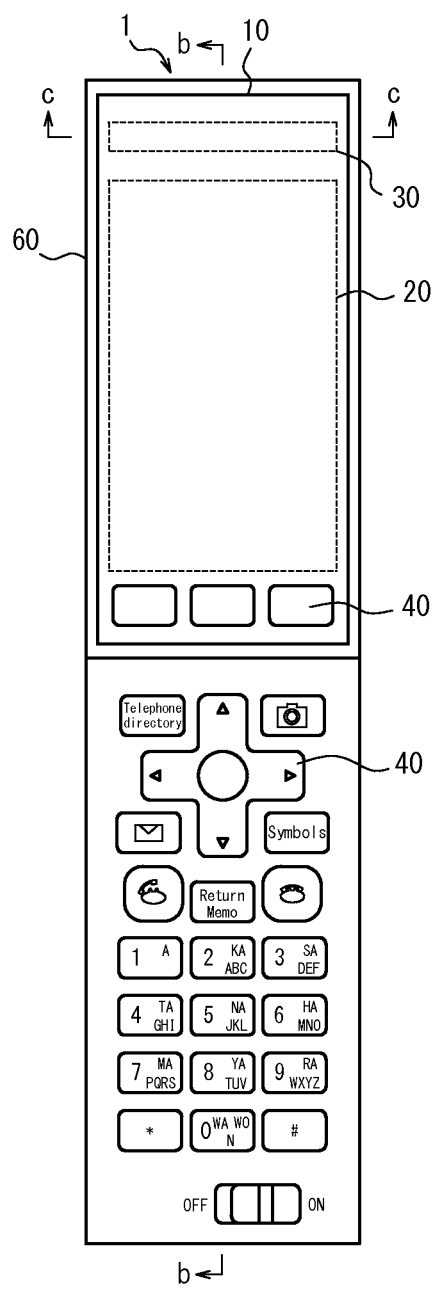
FIGS. 13A to 13C illustrate a housing configuration of an electronic device according to the second embodiment.
Figure 13B:
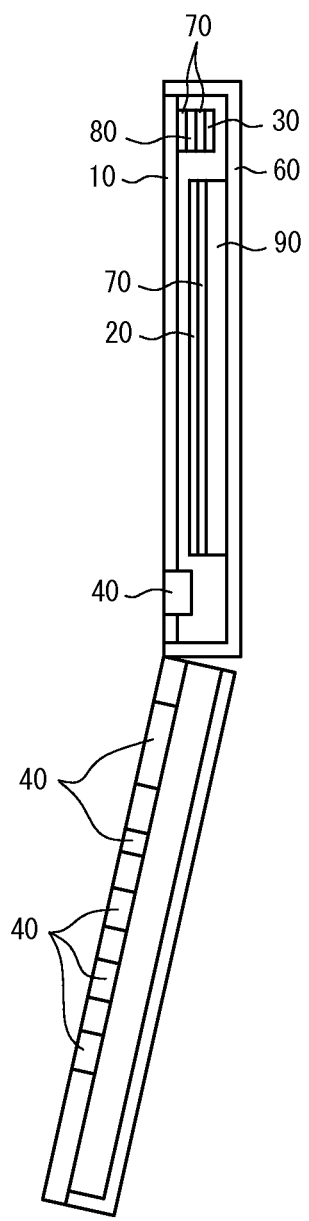
Figure 13C:
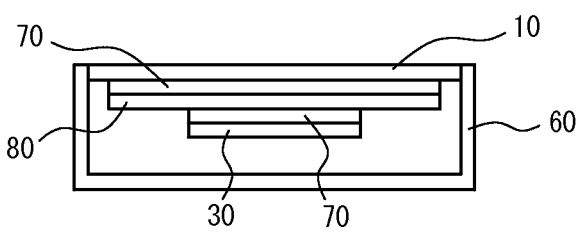

FIGS. 13A to 13C illustrate a housing configuration of the electronic device 1 according to the second embodiment. FIG. 13A is a front view, FIG. 13B is a sectional view taken along a line b-b in FIG. 13A and FIG. 13C is a sectional view taken along a line c-c in FIG. 13A. The electronic device 1 illustrated in FIGS. 13A to 13C is a foldable mobile phone in which a cover panel (e.g., an acryl plate), which serves as the panel 10 and is configured to cover the display 20, is provided on a front surface of the upper-side housing 60. In the second embodiment, the reinforcing member 80 is disposed between the panel 10 and the piezoelectric element 30. The reinforcing member 80 is, for example, a resin plate, a sheet metal, or a resin plate including glass fiber. That is to say, in the electronic device 1 according to the second embodiment, the piezoelectric element 30 and the reinforcing member 80 are adhered by the joining member 70, and the reinforcing member 80 and the panel 10 are adhered by the joining member 70. Furthermore, in the second embodiment, the display 20 is not adhered to the panel 10 but supported by the housing 60. That is to say, in the electronic device 1 according to the second embodiment, the display 20 is spaced apart from the panel 10, and the display 20 is adhered to a supporting portion 90, i.e., a part of the housing 60, by the joining member 70. The supporting portion 90 is not limited to be configured as the part of the housing 60 and may be formed by metal, resin, or the like, as a member independent from the housing 60.

Figure 14:
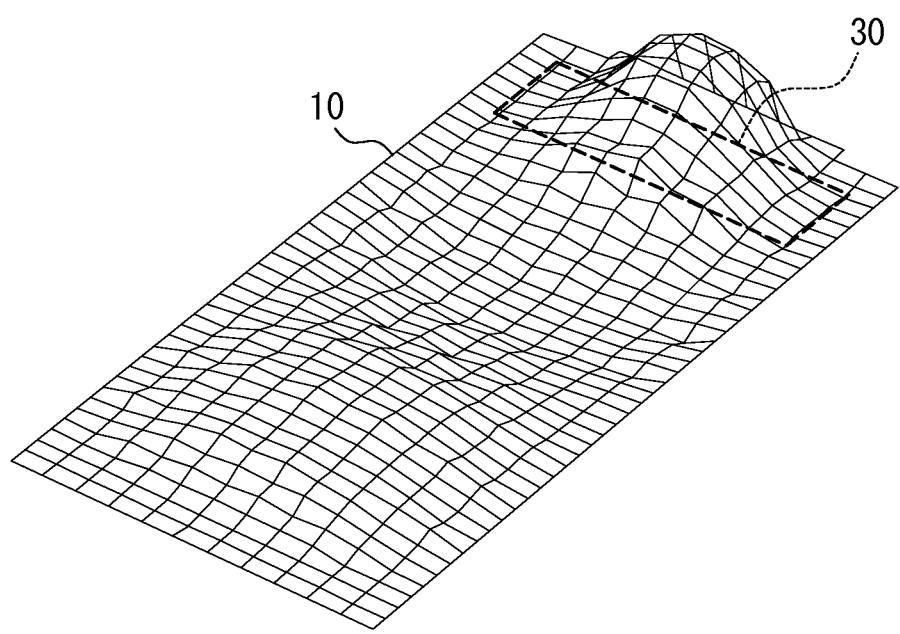
FIG. 14 illustrates one example of vibration of a panel of an electronic device according to the second embodiment.

FIG. 14 illustrates one example of the vibration of the panel 10 of the electronic device 1 according to the second embodiment. In the electronic device 1 according to the second embodiment, the panel 10 is the acryl plate with lower rigidity compared to a glass plate, and moreover, the display 20 is not adhered to the back surface of the panel 10. Accordingly, amplitude generated by the piezoelectric element 30 is larger than cases of the electronic device 1 according to the first embodiment illustrated in FIG. 11. The vibration is caused in an area of the panel 10 where the piezoelectric element 30 is disposed and in areas of the panel 10 that are away from the disposed area. Accordingly, the user is able to hear air conduction sound transmitted through air and to hear human-body vibration sound by placing the ear in contact with any position of the panel 10.

As described above, according to the electronic device 1 of the present embodiment, the reinforcing member 80 and the panel 10 are deformed due to deformation of the piezoelectric element 30 attached to the panel 10 via the reinforcing member 80, and air conduction sound and human-body vibration sound are transmitted to an object that is in contact with the deformed panel 10. Accordingly, air conduction sound and human-body vibration sound are transmitted to the user without the need for pressing the vibration body itself to the ear. Furthermore, the piezoelectric element 30 is attached to the surface of the panel 10 on the inner side of the housing 60. Accordingly, air conduction sound and human-body vibration sound are transmitted to the user without having to protrude the vibration body from the outer surface of the housing 60. Moreover, the deformation occurs in the area of the panel 10 where the piezoelectric element 30 is disposed and in other areas of the panel 10, for transmission of air conduction sound and human-body vibration sound. Accordingly, the user is able to hear air conduction sound transmitted through air and to hear human-body vibration sound by placing the ear in contact with any position of the panel 10.

Furthermore, disposing the reinforcing member 80 between the piezoelectric element 30 and the panel 10 makes it unlikely that, when, for example, the panel 10 is applied with an external force, the applied external force will be conveyed to the piezoelectric element 30 and damage the piezoelectric element 30. Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is decreased, and sound characteristics in a low frequency range are improved. Note that instead of the reinforcing member 80 a plate-shaped weight may be attached to the piezoelectric element 30 by the joining member 70.

Third Embodiment

Figure 15A:
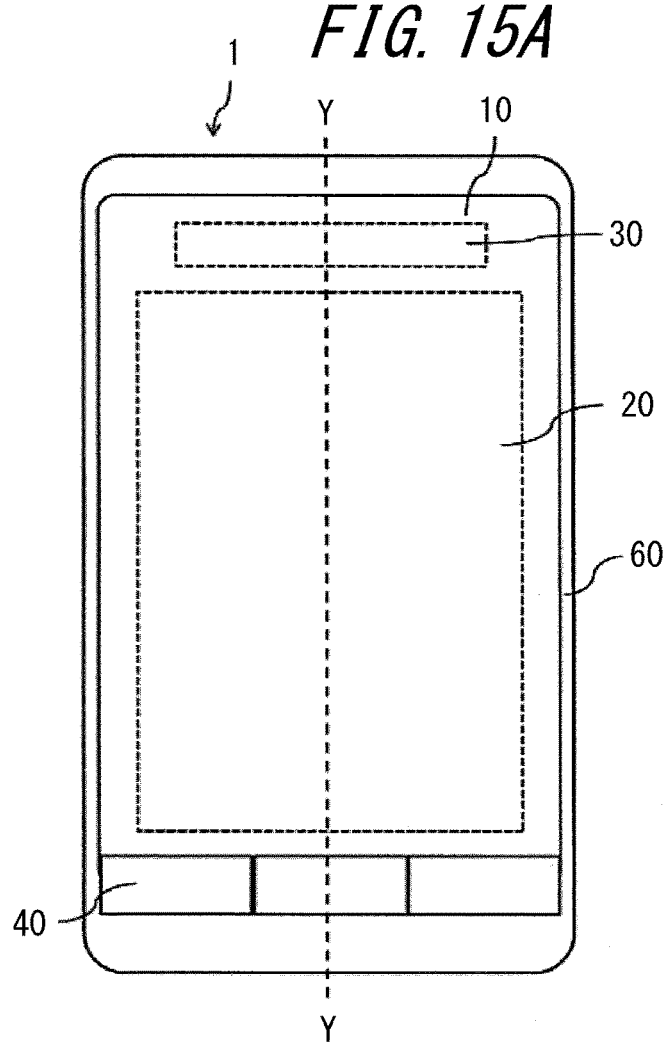
FIGS. 15A and 15B illustrate a configuration of an electronic device according to the third embodiment of the present disclosure.
Figure 15B:
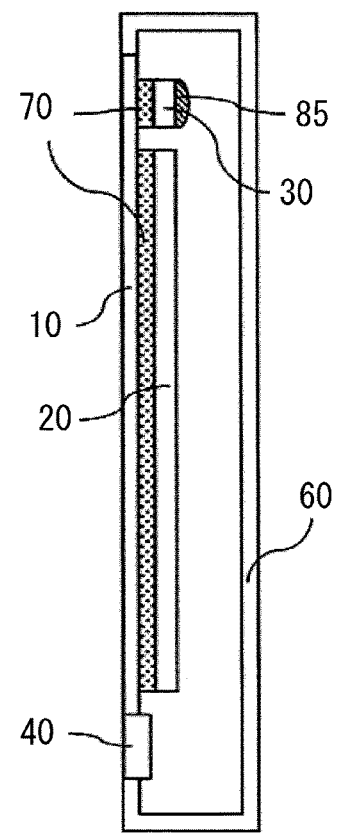

FIGS. 15A and 15B illustrate a configuration of the electronic device 1 according to the third embodiment of the present disclosure. FIG. 15A is a front view, and FIG. 15B is a sectional view taken along a line Y-Y in FIG. 15A. The electronic device 1 illustrated in FIGS. 15A and 15B is a smartphone in which a touch panel, i.e., a glass plate, is mounted as the panel 10 on the front surface of the housing 60 (e.g., a metal or a resin casing). The panel 10 is joined to the housing 60 by the joining member 70, and thus, attached to the housing 60. The joining member 70 herein is, for example, an adhesive agent, a double-sided adhesive tape, or the like. The display 20 and the piezoelectric element 30 are each adhered and attached to the panel 10 by the joining member 70. Examples of the joining member 70 that may be preferably used to attach the display 20 to the panel 10 include an optical elastic resin, which is a colorless and transparent ultraviolet-curable acrylic adhesive agent. Examples of the joining member 70 that may be preferably used to attach the piezoelectric element 30 to the panel 10 include a waterproof double-sided adhesive tape and an adhesive agent having thermosetting properties, ultraviolet-curable properties, or the like. The input unit 40 is attached to the housing 60, similarly to the panel 10. The panel 10, the display 20, and the piezoelectric element 30 each have a substantially rectangular shape.

The display 20 is disposed in substantially the middle of the panel 10 in the short-side direction thereof. The piezoelectric element 30 is disposed near the end portion of the panel 10 in the longitudinal direction of the panel 10 at a predetermined distance from the end portion in a manner such that the longitudinal direction of the piezoelectric element 30 extends along the short side of the panel 10. The display 20 and the piezoelectric element 30 are disposed side by side in the direction parallel to the surface of the inner side of the panel 10.

According to the electronic device 1 of the present embodiment with the above configuration, the panel 10 is deformed due to deformation of the piezoelectric element 30 attached to the back surface of the panel 10, and air conduction sound and vibration sound are transmitted to an object that is in contact with the deformed panel 10.

Figure 16:
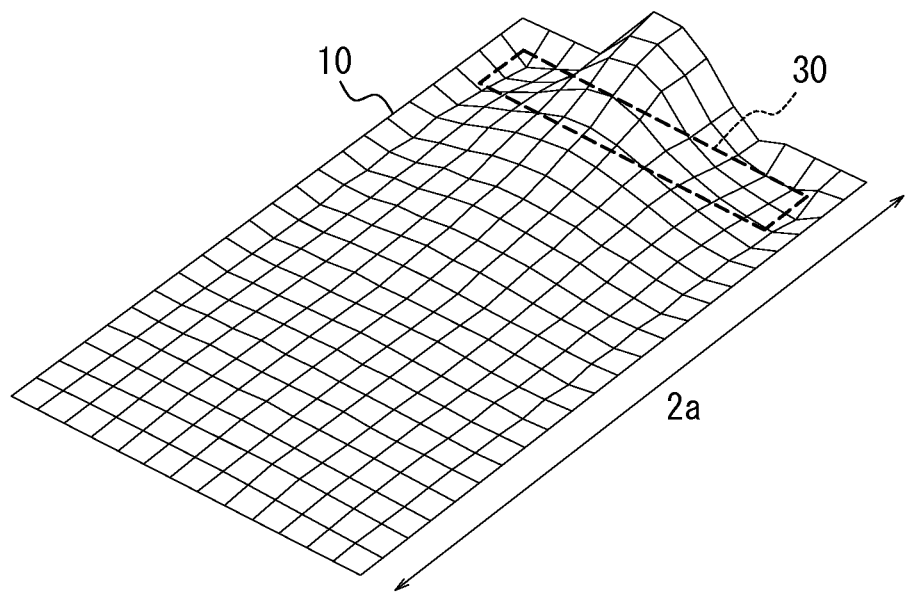
FIG. 16 illustrates one example of vibration of a panel of an electronic device according to the third embodiment of the present disclosure.

FIG. 16 illustrates one example of the vibration of the panel 10 of the electronic device 1 according to the third embodiment. As illustrated in the figure, in the electronic device 1 according to the present embodiment, the piezoelectric element 30 is attached to the upper portion of the panel 10, and the display 20 is attached to the lower portion of the panel 10 relative to the upper portion. The panel 10 is bent by the piezoelectric element 30 in a manner such that a portion of the panel 10 directly above the piezoelectric element 30 protrudes relative to neighboring portions of the panel 10 in the long-side direction 2a of the panel 10. On the other hand, the lower portion of the panel 10 that is attached with the display 20 is less likely to vibrate compared to the upper portion of the panel 10 that is attached with the piezoelectric element 30. As a result, the lower portion of the panel 10 provides less sound leakage due to the vibration occurring in the lower portion of the panel 10.

The above electronic device 1 transmits sound to the user by the vibration of the panel 10. In this regard, compared with cases where the piezoelectric element 30 is attached to the housing 60 to vibrate the housing 60, the user might drop the electronic device due to the vibration of the housing 60 during voice communication when the user holds the electronic device in the hand (since during voice communication the user usually holds the housing portion of the electronic device). In contrast, the electronic device 1, which vibrates the panel 10, hardly poses such a problem. Of course, however, the piezoelectric element 30 may also be attached to the housing 60 when the piezoelectric element 30 does not vibrate greatly.

With reference to FIG. 15B again, a protective member 85 is attached to a surface (hereinafter, called "the second main surface") of the piezoelectric element 30 that opposes to another surface (hereinafter, called "the first main surface") of the piezoelectric element 30 attached to the panel 10. The protective member 85 includes an elastic member of, for example, organic synthetic rubber, a representative of which includes polybutadiene-based, nitrile-based, and chloroprene-based synthetic rubber, and inorganic synthetic rubber, such as silicone. The protective member 85 may also be curable resin having thermosetting properties, thermoplasticity, moisture curable properties, ultraviolet-curable properties, or the like. The protective member 85 may also include a composite of an organic material and an inorganic material (or metal). One example is a composite member (reinforced resin) obtained by mixing glass fiber, metallic fiber, carbon fiber, or the like into a polyimide-based resin as the base material. The strength, rigidity, and elasticity of the composite member may be controlled appropriately in accordance with the content of the glass fiber, metallic fiber, carbon fiber, or the like with respect to the polyamide-based resin. The reinforced resin as described above may be prepared, for example, by forming a medium by interleaving glass fiber, metallic fiber, carbon fiber, or the like, impregnating the medium with resin, and then curing the resin. The reinforced resin may also be prepared by mixing finely cut fiber pieces into liquid resin and subsequently curing the resin. Furthermore, the reinforced resin may be a lamination of a fiber-interleaved medium with layers of resin.

In the electronic device 1 according to the present disclosure, the protective member 85 is attached to the second main surface of the piezoelectric element 30. The above configuration allows, when, for example, the impact caused by dropping or the like of the electronic device 1 brings the piezoelectric element 30 into contact with another member (e.g., a corner portion, an electronic member, or the like that protrudes inwardly in the housing 60) disposed near the piezoelectric element 30, the protective member 85 to mitigate the impact from the contact, thus preventing damage to the piezoelectric element 30.

A surface of the protective member 85 that opposes to another surface of the protective member 85 attached to the piezoelectric element 30 may have a convex curved shape. When, as illustrated in FIG. 15B, the protective member 85 has a convex curved surface in the section taken along the line Y-Y, it is experimentally known that the protective member 85 tends to be better deformed in conjunction with bending and displacement of the piezoelectric element 30 than in cases where the protective member 85 has a flat plate shape and has the same thickness as the thickest portion of the convex protective member. That is to say, the protective member 85 with a convex curved shape is less likely to interfere with deformation of the piezoelectric element 30 than that with a flat plate shape, and accordingly, prevents external force from damaging the piezoelectric element 30 while preventing a decrease in sound pressure.

One possible way of attaching the protective member 85 to the piezoelectric element 30 is, for example, to process an organic or an inorganic synthetic resin to impart the resin with a flat surface portion to be attached to the piezoelectric element 30 and with a curved surface portion opposing to the flat surface portion and then, attaching the rubber to the piezoelectric element 30. Alternatively, the protective member 85 may be formed by applying or dripping the aforementioned curable resin to the surface of the piezoelectric element 30 that opposes to the surface of the piezoelectric element 30 attached to the panel 10 and then, curing the resin. At room temperature, even an uncured curable resin has a certain degree of viscosity. Accordingly, when being applied or dripped onto the piezoelectric element 30, the curable resin assumes a curved shape due to surface tension thereof and may be cured while maintaining the curved shape.

Although in FIGS. 15A and 15B the protective member 85 covers the second main surface of the piezoelectric element 30, the present embodiment is not limited to this example, and the protective member 85 may also cover the second main surface of the piezoelectric element 30 and side surfaces extending from the second main surface. Furthermore, the protective member 85 may cover a surface of the piezoelectric element 30 other than the first main surface. The above configuration allows the protective member 85 to mitigate impact even to the side surfaces of the piezoelectric element 30.

FIGS. 17A to 17E illustrate the first modification of the third embodiment of the present disclosure. FIG. 17A is a back view of the panel 10 to which the piezoelectric element 30 is attached in the electronic device 1, FIGS. 17B and 17D are sectional views of different patterns taken along a line X-X in FIG. 17A, and FIGS. 17C and 17E are sectional views of the different patterns taken along a line Y-Y in FIG. 17A. FIG. 17A illustrates a surface of the panel 10 that is visible from the side of the panel 10 on which the piezoelectric element 30 is disposed (and this also applies to the modifications below). Herein, since the piezoelectric element 30 is covered by the protective member 85, the piezoelectric element 30 is not visible from the surface of the panel 10 that is located on the side of the piezoelectric element 30. However, for better comprehension of relative arrangement of the piezoelectric element 30 and other members, a portion corresponding to the piezoelectric element 30 is indicated in white so that the piezoelectric element 30 becomes visible in FIG. 17A (and this also applies to the modifications below).

In the present modification, an intermediate member 110 is disposed between the panel 10 and the piezoelectric element 30. The intermediate member 110 is attached to the panel 10 and the piezoelectric element 30 by the first joining member 71 (e.g., a double-sided adhesive tape) or the second joining member 81 (e.g., an adhesive agent including curable resin). The intermediate member 110 herein is, for example, the aforementioned reinforced resin.

A Flexible Printed Circuit (FPC) 120 is attached to a surface (the second main surface) of the piezoelectric element 30 that opposes to another surface (the first main surface) of the piezoelectric element 30 attached to the intermediate member 110. The FPC 25 includes, for example, a film insulator (a base film) made of resin such as polyimide, a conductor layer (a signal line) formed on the base film, and an insulator covering the conductor layer except for an area corresponding to a terminal portion. The terminal portion of the FPC 25 and an electrode terminal portion of the piezoelectric element 30 are connected by adhesion using a joining material including, for example, a solder material, an anisotropic conductive material (an anisotropic conductive paste or an anisotropic conductive film) composed mainly of electrically insulating resin in which conductive particles are mixed, or the like.

The FPC 25 is attached to a left end portion of the second main surface of the piezoelectric element 30 and extends from the attaching position to be electrically connected to the controller 50 which is not illustrated. The FPC 25 conveys an electric signal applied from the controller 50 to the piezoelectric element 30.

The protective member 85 is attached to the second main surface of the piezoelectric element 30. Herein, since the FPC 25 is attached to a part of the second main surface of the piezoelectric element 30 as described above, the protective member 85 is actually disposed to cover both the piezoelectric element 30 and the FPC 25. Accordingly, in FIG. 17A, a part of the FPC 25, especially, a part of the FPC 25 attached to the piezoelectric element 30, that is covered by the protective member 85 and is invisible is represented by a dotted line. Additionally, the protective member 85 may also be attached to a part of the second main surface of the piezoelectric element 30 other than the area thereof to which the FPC 25 is attached. The modifications described below include the similar arrangement configuration of the FPC 25, and a description of the FPC 25 is omitted unless reference needs to be made particularly.

A surface (a surface located on an upper side in each of FIGS. 17B, 17C, 17D, and 17E) of the protective member 85 that opposes to another surface of the protective member 85 attached to the piezoelectric element 30 has a convex curved shape. The protective member 85 with the above shape is less likely to interfere with deformation of the piezoelectric element 30 than that with a flat plate shape, and accordingly, prevents external force from damaging the piezoelectric element 30 while preventing a decrease in sound pressure.

Although in FIGS. 17A to 17E the protective member 85 covers the second main surface of the piezoelectric element 30, the present modification is not limited to this example, and the protective member 85 may also cover the second main surface of the piezoelectric element 30 and side surfaces extending from the second main surface. The above configuration allows the protective member 85 to mitigate impact even to the side surfaces of the piezoelectric element 30.

In FIGS. 17B and 17C (illustrating Pattern 1), an area of a surface of the intermediate member 110 that is attached to the piezoelectric element 30 is larger than an area of the first main surface of the piezoelectric element 30. The intermediate member 110 has the surface that is larger than the first main surface of the piezoelectric element 30 in the X-X direction and the Y-Y direction, and by dripping a curable resin as the protective member 85 to cover the larger surface, all the surfaces of the piezoelectric element 30, except for the first main surface, are covered by the resin. At this time, since the intermediate member 110, which has the larger surface than the first main surface of the piezoelectric element 30, is disposed between the piezoelectric element 30 and the panel 10, the dripped curable resin is less likely to adhere to the panel 10.

In FIGS. 17D and 17E (illustrating Pattern 2), the intermediate member 110 has a concave shape with an aperture surface being attached to the panel 10. Space defined between the panel 10 and the intermediate member 110 is filled with, for example, a curable resin as the second joining member 81 (the curable resin may be injected through a through hole 100 provided, for example, in a part of the intermediate member 110). Furthermore, as illustrated in FIG. 17E, a surface of an inner side of the intermediate member 110 is provided with one or more grooves. The grooves provided in the intermediate member 110 increase an area over which the curable resin as the second joining member 81 and the intermediate member 110 are joined, and consequently, the curable resin and the intermediate member 110 are joined more firmly. Additionally, a surface of the intermediate member 110 that is attached to the panel 10 or the piezoelectric element 30 may be provided with a groove. This allows the intermediate member 110 to be attached to the panel 10 or to the piezoelectric element 30 more firmly.

FIGS. 18A to 18C illustrate the second modification of the third embodiment of the present disclosure. FIG. 18A is a back view of the panel 10 to which the piezoelectric element 30 is attached in the electronic device 1, FIG. 18B is a sectional view taken along a line X-X in FIG. 18A, and FIG. 18C is a sectional view taken along a line Y-Y in FIG. 18A. The piezoelectric element 30 is attached to the panel 10 by the first joining member 71 and the second joining member 81. The electronic device 1 in the present modification includes a frame member 95 surrounding the piezoelectric element 30, and the frame member 95 is attached to the panel 10. The first main surface of the piezoelectric element 30 includes an edge area that is attached to the panel 10 by the first joining member 71. The joining member 71 herein is, for example, a double-sided adhesive tape. The first joining member 71 is not attached to the entire edge area of the first main surface of the piezoelectric element 30. That is to say, an area where the first joining member 71 is attached to the piezoelectric element 30 is not a closed area. For example, as illustrated in FIG. 18B, the first joining member 71 is not disposed in a part of a left end of the first main surface of the piezoelectric element 30 in the X-X direction. The part in which the first joining member is not disposed serves as a passage for a curable resin as the second joining member 81 which is later described.

All the areas, except for the edge area, of the first main surface of the piezoelectric element 30 are attached to the panel 10 by the second joining member 81. The second joining member 81 is, for example, a curable resin. The curable resin may be poured into a substantially box-shaped mold defined by the panel 10 and an inner wall surface of the frame member 95 while the piezoelectric element 30 has been attached to the panel 10 by the first joining member 71 in advance. The curable resin thus enters space defined by the panel 10 and the piezoelectric element 30, and then, once the curable resin is cured, the piezoelectric element 30 is attached to the panel 10. At this time, the curable resin enters the space defined between the panel 10 and the piezoelectric element 30 through the part of the piezoelectric element 30 in which the first joining member is not disposed.

According to the above approach of attaching the piezoelectric element 30 to the panel 10 by the first joining member 71 in advance, the space defined between the piezoelectric element 30 and the panel 10 is maintained, and the curable resin may be cured while maintaining a sufficient thickness in the space. Consequently, the piezoelectric element 30 is attached to the panel 10 more firmly.

Although FIG. 18B illustrates an example where the first joining member is not disposed in the part of the left end of the first main surface of the piezoelectric element 30 in the X-X direction, the present modification is not limited to this example. In addition to the part of the left end in the X-X direction, there may be a part of the right end that opposes the left end in which the first joining member is not disposed. With this configuration, the curable resin may enter through the passage formed in the left end in the X-X direction, and moreover, air that is present in the space defined between the panel 10 and the piezoelectric element 30 may be vented through a passage formed in the right end in the X-X direction.

The curable resin as the second joining member 81 may be poured substantially throughout the box-shaped inner space defined by the panel 10 and the inner wall surface of the frame member 95. Consequently, when the inner wall surface of the frame member 95 is higher than the second main surface of the piezoelectric element 30 (the upper surface of the piezoelectric element 30), the second main surface and the side surfaces of the piezoelectric element 30 are covered by the curable resin (i.e., substantially the entire piezoelectric element 30 is covered by the resin). The above configuration allows the curable resin as the second joining member 81 to mitigate propagation of the impact to the piezoelectric element 30 caused by external force, similarly to the aforementioned protective member 85. Thus, the second joining member 81 in the present modification provides the same advantageous effect as that of the protective member 85 in the present disclosure. Besides, fixing the piezoelectric element 30 by the curable resin prevents the piezoelectric element 30 from being detached from the panel 10 in response to external impact or the like.

According to the present disclosure, since the curable resin as the second joining member 81 is poured into the substantially box-shaped mold defined by the panel 10 and the inner wall surface of the frame member 95, a configuration where the piezoelectric element 30 attached to the panel 10 is covered by the resin is easily achieved.

Although in the electronic device 1 of FIGS. 18A to 18C the piezoelectric element 30 is attached to the panel 10 by the first joining member 71 and the second joining member 81, the electronic device 1 does not necessarily need to have this configuration, and the piezoelectric element 30 may also be attached to the panel 10 only by one of the first joining member 71 and the second joining member 81. For example, the entire first main surface of the piezoelectric element 30 may be attached to the panel 10 by a double-sided adhesive tape as the first joining member 71. The double-sided adhesive tape used herein is, for example, a sheet that has a three-layer structure including a polymer film whose upper and lower surfaces are each coated with an adhesive agent, that has high flexibility, and that is less likely to interfere with deformation of the piezoelectric element 30 and consequently, improves sound pressure characteristics. On the other hand, when a curable resin having a higher adhesive strength than the double-sided adhesive tape is used, generally, the piezoelectric element 30 is attached to the panel 10 even more firmly, and the impact to the panel 10 or the like is less likely to propagate to the piezoelectric element 30. Accordingly, partial separation of the piezoelectric element 30 from the panel 10 is prevented. Since separation of the piezoelectric element 30 from the panel 10 is prevented, the impact to the panel 10 or the like is less likely to propagate to any part of the piezoelectric element 30, and consequently, the piezoelectric element 30 is less likely to damage.

Although in FIG. 18B the first joining member 71 is not disposed in the part of the edge area on the first main surface of the piezoelectric element 30, the present modification is not limited to this example, and the first joining member 71 may be attached to the entire edge area on the first main surface of the piezoelectric element 30 (i.e., the area where the first joining member 71 is attached may form a closed area). In this case, all the areas, except for the edge area, of the first main surface of the piezoelectric element 30 are not joined to the panel 10 by any joining member. Accordingly, in all the areas, except for the edge area, of the first main surface of the piezoelectric element 30, deformation of the piezoelectric element 30 is not interfered with by any joining member. The above configuration improves sound pressure characteristics of the electronic device 1 by preventing interference in deformation of the piezoelectric element 30 compared with cases where the entire first main surface of the piezoelectric element 30 is attached to the panel 10 by the first joining member 71 or the second joining member 81.

Figure 19A:
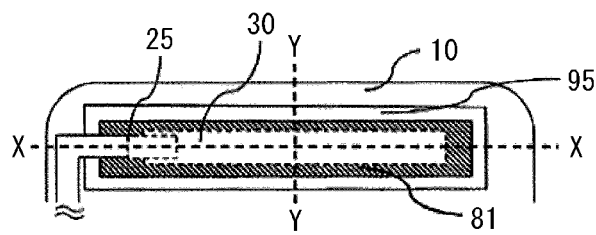
FIGS. 19A to 19I illustrate the third modification of the third embodiment of the present disclosure.
Figure 19B:
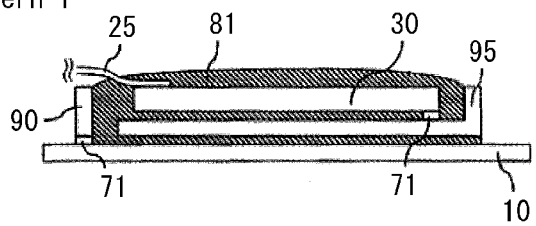
Figure 19C:
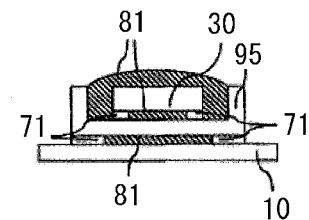

FIGS. 19A to 19I illustrate the third modification of the third embodiment of the present disclosure. FIG. 19A is a back view of the panel 10 to which the piezoelectric element 30 is attached in the electronic device 1, FIGS. 19B, 19D, 19F, and 19H are sectional views of different patterns taken along a line X-X in FIG. 19A, and FIGS. 19C, 19E, 19G, and 19I are sectional views of the different patterns taken along a line Y-Y in FIG. 19A. The present modification differs from the aforementioned first modification in that the frame member 95 included in the electronic device 1 further includes, in addition to the wall surface portion surrounding the piezoelectric element 30, a bottom surface portion extending from the wall surface portion. The bottom surface portion of the frame member 95 is disposed between the panel 10 and the piezoelectric element 30 and is attached to the panel 10 and the piezoelectric element 30 by the first joining member 71 and the second joining member 81. Herein, a surface of the piezoelectric element 30 that is attached to the bottom surface portion of the frame member 95 is called the first main surface. The first main surface of the piezoelectric element 30 includes an edge area that is attached to the bottom surface portion of the frame member 95 by the first joining member 71 (e.g., a double-sided adhesive tape). Additionally, there may be a part of the edge area on the first main surface of the piezoelectric element 30 in which the first joining member 71 is not attached. As illustrated in FIGS. 19B and 19C (illustrating Pattern 1), the bottom surface portion of the frame member 95 includes an edge area that is attached to the panel 10 by the first joining member 71.

Since the frame member 95 has the substantially box shape defined by the wall surface portion and the bottom surface portion, the curable resin as the second joining member 81 may be poured into the frame member 95. Accordingly, the piezoelectric element 30 is fixed by the resin in the frame member 95, and this in turn prevents the piezoelectric element 30 from being detached from the bottom surface portion of the frame member 95. Furthermore, after being poured into the frame member 95, the curable resin also enters space defined between the piezoelectric element 30 and the bottom surface portion of the frame member 95 through a passage formed in a part of the edge area on the first main surface of the piezoelectric element 30 in which the first joining member 71 is not disposed, thereby fixing the piezoelectric element 30 to the frame member 95.

Figure 19D:
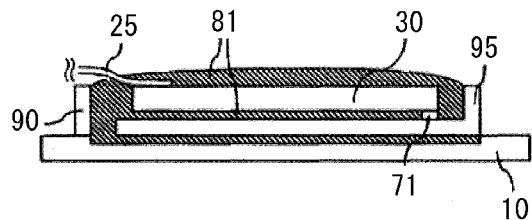

The bottom surface portion of the frame member 95 may be provided, in a part thereof, with a through hole. For example, as illustrated in FIGS. 19B and 19D, the through hole may be provided in the vicinity of a left end of the bottom surface portion of the frame member 95 in the X-X direction. Providing the through hole allows the curable resin, which has been poured into the frame member 95, to enter space defined between the bottom surface portion of the frame member 95 and the panel 10 through the through hole. Once the curable resin is cured, the frame member 95 is attached to the panel 10. As described above, in FIGS. 19B and 19C (illustrating Pattern 1), the edge area of the bottom surface portion of the frame member 95 is attached to the panel 10 by the first joining member 71, and therefore, the space is defined between the bottom surface portion and the panel 10 to let the curable resin to make an entrance.

Additionally, there may be a part of the edge area of the bottom surface portion of the frame member 95 in which the first joining member 71 is not attached. Such a part of the frame member 95 may serve as a passage for venting, when the curable resin enters the space defined between the bottom surface portion and the panel 10 through a through hole provided, for example, in the bottom surface portion of the frame member 95, air that is present in the space. When the passage for venting air is formed in the vicinity of an end portion (a right end in the X-X direction) of the bottom surface portion of the frame member 95 that opposes to another end portion of the bottom surface portion of the frame member 95 provided with the through hole as illustrated in FIG. 19B, the entered curable resin is less likely to leak to the outside through the passage.

It is not necessarily requisite that the edge area of the bottom surface portion of the frame member 95 be attached to the panel 10 by the first joining member 71. For example, space through which the second joining member 81 enters may be formed between the panel 10 and the bottom surface portion of the frame member 95 by shaping the panel 10 into a concave shape as illustrated in FIGS. 19D and 19E (illustrating Pattern 2).

Figure 19E:
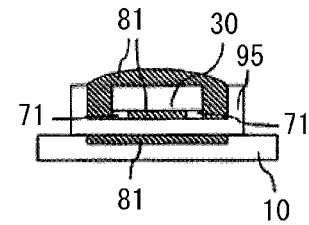
Figure 19F:
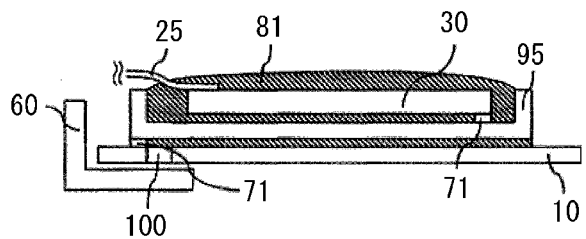
Figure 19G:
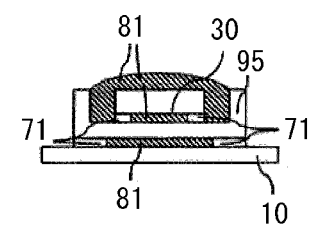

Although in FIGS. 19B and 19C (illustrating Pattern 1) and FIGS. 19D and 19E (illustrating Pattern 2) the bottom surface portion of the frame member 95 is provided, in a part thereof, with the through hole, the through hole may be omitted. FIGS. 19F and 19G (illustrating Pattern 3) and FIGS. 19H and 19I (illustrating Pattern 4) illustrate examples where no through hole is provided in the bottom surface portion of the frame member 95. In FIGS. 19F and 19G (illustrating Pattern 3), the edge area of the bottom surface portion of the frame member 95 is attached to the panel 10 by the first joining member 71, and the panel 10 is provided with a through hole 100 within an area of the panel 10 over which the bottom surface portion of the frame member 95 is attached. By pouring the curable resin through the through hole 100 provided in the panel 10, the space defined between the panel 10 and the bottom surface portion of the frame member 95 is filled with the curable resin. Consequently, the frame member 95 and the panel 10 are attached by the resin.

It is not necessarily requisite that the edge area of the bottom surface portion of the frame member 95 be attached to the panel 10 by the first joining member 71. For example, space through which the second joining member 81 enters may be formed between the panel 10 and the bottom surface portion of the frame member 95 by shaping the panel 10 into a concave shape as illustrated in FIGS. 19H and 19I (illustrating Pattern 4).

Figure 19H:
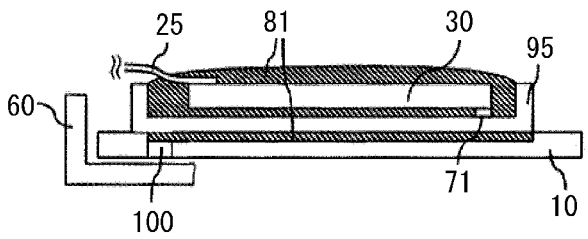
Figure 19I:
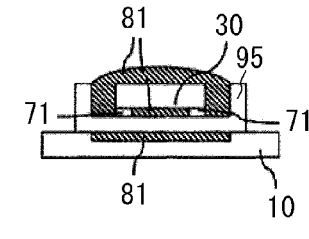

In the configurations of FIGS. 19F and 19G (illustrating Pattern 3) and FIGS. 19H and 19I (illustrating Pattern 4), a bezel may also be provided to cover the through hole 100 provided in the panel 10. The bezel may extend from a part of the housing 60 that forms a side surface of the electronic device 1. The bezel covers the through hole 100 provided in the panel 10 to make the through hole 100 unexposed to the outside of the electronic device 1, and accordingly, the appearance is not spoiled.

The bottom surface portion of the frame member 95 is attached to the panel 10 and the piezoelectric element 30 and is disposed between the panel 10 and the piezoelectric element 30. Herein, when, for example, the frame member 95 is made of iron, stainless, aluminum, or the like, the bottom surface portion of the frame member 95 also serves as a reinforcing plate that prevents, when external force is applied to the panel 10, propagation of the external force to the piezoelectric element 30, thus preventing damage to the piezoelectric element 30.

Although in the above configurations the piezoelectric element 30 is attached to the bottom surface portion of the frame member 95, the present modification is not limited to these examples, and the piezoelectric element 30 may be attached to the wall surface portion of the frame member 95.

Meanwhile, in some cases in assembly of members constituting the electronic device 1 during manufacturing of the electronic device 1 according to the present disclosure, a unit or the like including a predetermined combination of independent members or sets of members may be transported. In these cases, when a unit includes the protective member 85 attached to a predetermined surface of the piezoelectric element 30 as described above, damage due to external impact or the like is prevented during transportation. At this time, when at least a part of the piezoelectric element 30 is covered by a curable resin, external impact may be mitigated by the curable resin during transportation. Needless to say, when a surface of the piezoelectric element 30 other than the predetermined surface attached with the protective member 85 is attached to a predetermined plate-shaped member, the unit is capable of deforming the plate-shaped member due to deformation of the piezoelectric element 30 to thereby transmit human-body vibration sound to an object that is in contact with the plate-shaped member.

A surface of the protective member 85 that opposes to another surface of the protective member 85 attached to the piezoelectric element 30 may have a convex curved shape. Such a protective member 85 is less likely to interfere with deformation of the piezoelectric element 30 than that with a flat plate shape.

Furthermore, when a unit including the piezoelectric element 30 fixed in the frame member 95 in advance is formed by attaching the piezoelectric element 30 to a bottom portion of an inner side of the frame member (hereinafter, may be called "the box-shaped member") including the wall surface portion and the bottom surface portion as described above and by pouring a curable resin into the box-shaped member, damage due to external impact or the like is prevented during transportation. In this case, when a surface of the bottom portion of the box-shaped member that opposes to another surface of the bottom portion of the box-shaped member attached with the piezoelectric element 30 is attached to a predetermined plate-shaped member, the plate-shaped member is deformed due to deformation of the piezoelectric element 30, and human-body vibration sound is transmitted to an object that is in contact with the plate-shaped member.

The piezoelectric element 30 included in the above unit does not necessarily need to be attached to a box-shaped member. For example, the unit may include the piezoelectric element 30 attached to a predetermined plate-shaped member (the first plate-shaped member) and also include a predetermined protective member attached to a surface (the second main surface) of the piezoelectric element 30 that opposes to another surface (the first main surface) of the piezoelectric element 30 that is attached to the first plate-shaped member. The predetermined protective member includes, for example, an elastic member, a curable resin, or the like as described above, and the protective member mitigates external impact by covering the second main surface of the piezoelectric element 30.

FIGS. 20A to 20E illustrate the fourth modification of the third embodiment of the present disclosure. FIG. 20A is a back view of the panel 10 to which the piezoelectric element 30 is attached in the electronic device 1, FIGS. 20B and 20D are sectional views of different patterns taken along a line X-X in FIG. 20A, and FIGS. 20C and 20E are sectional views of the different patterns taken along a line Y-Y in FIG. 20A. In the present modification, the frame member 95 includes the bottom surface portion, the first wall surface portion standing from a surface of the bottom surface portion that is attached with the piezoelectric element 30, and the second wall surface portion standing from another surface of the bottom surface portion that opposes to the surface of the bottom surface portion attached with the piezoelectric element 30. With the second wall surface portion, the frame member 95 defines space between the panel 10 and the bottom surface portion of the frame member 95 when the second wall portion is attached to the panel 10, and a curable resin or the like as the second joining member 81 may be filled into the defined space. Accordingly, in the present modification, the space between the bottom surface portion and the panel 10 is defined easily without the need for disposing the first joining member 71 between the bottom surface portion of the frame member 95 and the panel 10 or for forming a part of the panel 10 into a concave shape. Additionally, as illustrated in FIGS. 20A to 20E, the first wall surface portion and the second wall surface portion standing from the bottom surface portion of the frame member 95 may be flush with each other, i.e., may be integrated to form a side surface of the frame member 95.

In the configuration of FIGS. 20B and 20C (illustrating Pattern 1), the bottom surface portion of the frame member 95 is provided in a part thereof with a through hole through which the curable resin poured into the frame member 95 enters the space defined between the panel 10 and the bottom surface portion of the frame member 95. In the configuration in FIGS. 20D and 20E (illustrating Pattern 2), the panel 10 is provided with a through hole 100 through which the curable resin is poured to be filled into the space defined between the panel 10 and the bottom surface portion of the frame member 95. The through hole 100 provided in the panel 10 is covered by, for example, a bezel extending from the housing 60.

FIGS. 21A to 21E illustrate the fifth modification of the third embodiment of the present disclosure. FIG. 21A is a back view of the panel 10 to which the piezoelectric element 30 is attached in the electronic device 1, FIGS. 21B and 21D are sectional views of different patterns taken along a line X-X in FIG. 21A, and FIGS. 21C and 21E are sectional views of the different patterns taken along a line Y-Y in FIG. 21A. The electronic device 1 of the present modification includes a cover member 91 that is attached to the panel 10. The cover member 91 includes a wall surface portion surrounding the piezoelectric element 30 and a top surface portion extending from the wall surface portion.

As illustrated in FIGS. 21A to 21E, the piezoelectric element 30 is disposed in space defined by the panel 10 and the cover member 91. Thus, the cover member 91 protects the piezoelectric element 30 against external impact.

In the present modification, the space defined by the cover member 91 and the panel 10 may be filled with a curable resin or the like as the second joining member 81. The above configuration fixes the piezoelectric element 30 by the curable resin and prevents the piezoelectric element 30 from being detached from the panel 10 in response to external impact. In the configuration of FIGS. 21B and 21C (illustrating Pattern 1), the cover member 91 is provided in a part thereof with the through hole 100 through which the curable resin is poured to be filled into the space defined in the cover member 91. In the configuration in FIGS. 21D and 21E (illustrating Pattern 2), the panel 10 is provided with the through hole 100 through which the curable resin is poured to be filled into the space defined in the cover member 91.

In the present modification, as illustrated in FIGS. 21B and 21C (illustrating Pattern 1), the FPC 25 extends from a part of the piezoelectric element 30 where the FPC 25 is attached to the outside of the cover member 91 through the through hole 100. However, the present modification is not limited to this example, and as illustrated in FIGS. 21D and 21E (illustrating Pattern 2), additional hole may be provided in the cover member 91, and the FPC 25 may extend through the additional hole.

Fourth Embodiment

Figure 22A:
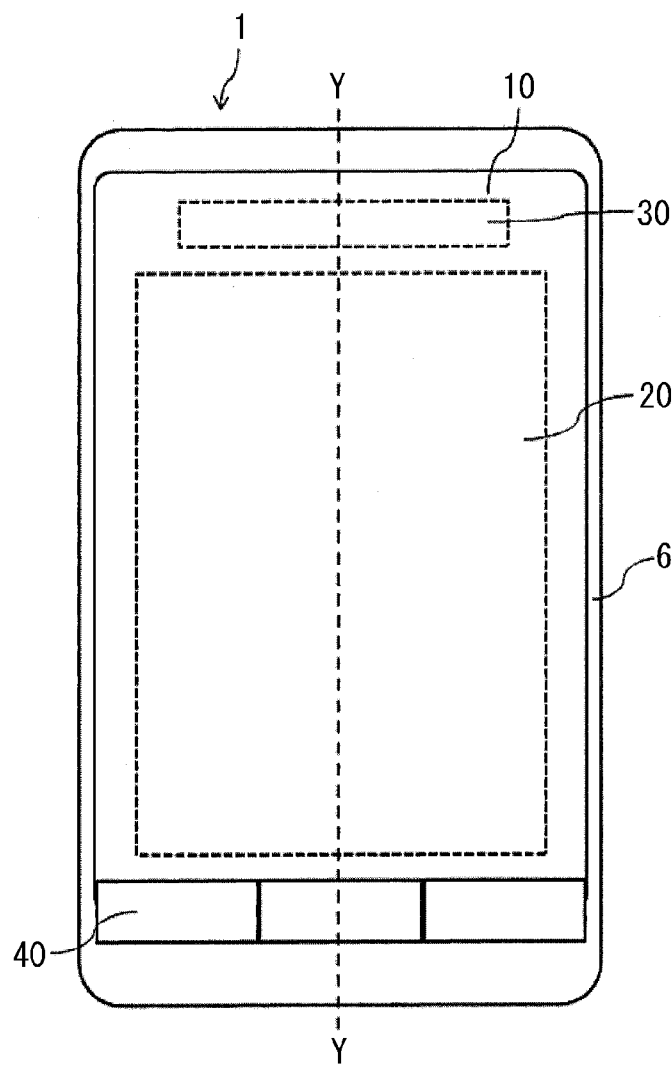
FIGS. 22A and 22B illustrate a configuration of an electronic device according to the fourth embodiment.
Figure 22B:
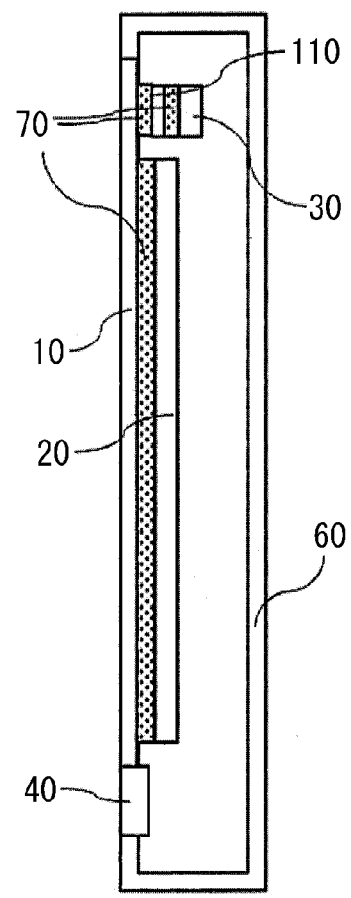

FIGS. 22A and 22B illustrate a configuration of the electronic device 1 according to the fourth embodiment of the present disclosure. FIG. 22A is a front view, and FIG. 22B is a sectional view taken along a line Y-Y in FIG. 22A. The electronic device 1 illustrated in FIGS. 22A and 22B is a smartphone in which a touch panel, i.e., a glass plate, is mounted as the panel 10 on the front surface of the housing 60 (e.g., a metal or a resin casing). The panel 10 is joined to the housing 60 by the joining member 70, and thus, attached to the housing 60. The joining member 70 used to attach the panel 10 to the housing 60 is, for example, an adhesive agent or a double-sided adhesive tape. The display 20 is adhered and attached to the panel 10 by the joining member 70. Examples of the joining member 70 that may be preferably used to attach the display 20 to the panel 10 include an optical elastic resin, which is a colorless and transparent ultraviolet-curable acrylic adhesive agent. The piezoelectric element 30 is joined to the panel 10 by way of the intermediate member 110. The piezoelectric element 30 is attached to the intermediate member 110 by the joining member 70, and the intermediate member 110 is attached to the panel 10 by the joining member 70. A description is given later in detail of how the intermediate member 110, the panel 10, and the piezoelectric element 30 are attached. The input unit 40 is attached to the housing 60, similarly to the panel 10. The panel 10, the display 20, and the piezoelectric element 30 each have a substantially rectangular shape.

The display 20 is disposed in substantially the middle of the panel 10 in the short-side direction thereof. The piezoelectric element 30 is disposed near the end portion of the panel 10 in the longitudinal direction of the panel 10 at a predetermined distance from the end portion in a manner such that the longitudinal direction of the piezoelectric element 30 extends along the short side of the panel 10. The display 20 and the piezoelectric element 30 are disposed side by side in the direction parallel to the surface of the inner side of the panel 10.

According to the electronic device 1 of the present embodiment with the above configuration, the panel 10 is deformed due to deformation of the piezoelectric element 30 attached to the back surface of the panel 10, and air conduction sound and vibration sound are transmitted to an object that is in contact with the deformed panel 10.

Figure 23:
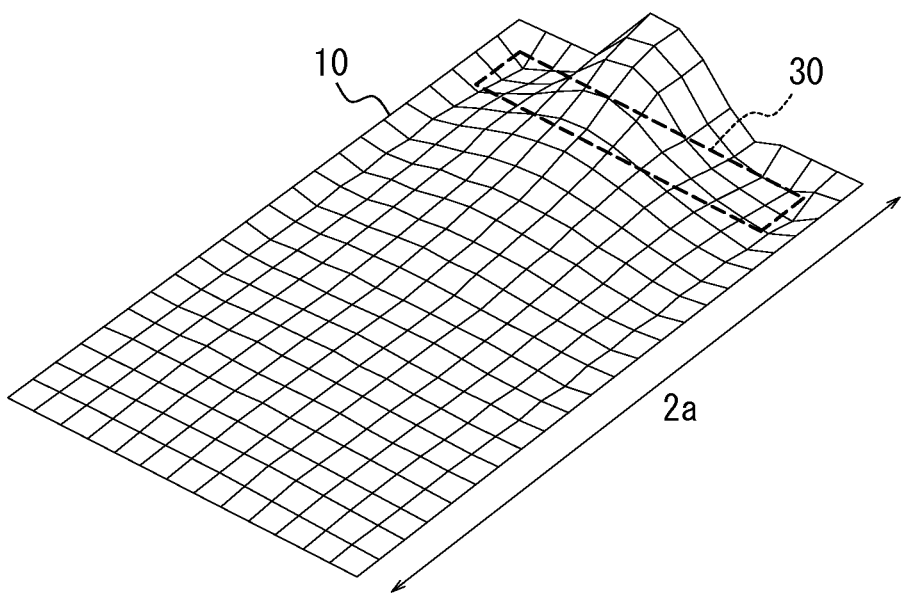
FIG. 23 illustrates one example of vibration of a panel of an electronic device according to the fourth embodiment.

FIG. 23 illustrates one example of the vibration of the panel 10 of the electronic device 1 according to the fourth embodiment. As illustrated in the figure, in the electronic device 1 according to the present embodiment, the piezoelectric element 30 is attached to the upper portion of the panel 10, and the display 20 is attached to the lower portion of the panel 10 relative to the upper portion. The panel 10 is bent by the piezoelectric element 30 in a manner such that a portion of the panel 10 directly above the piezoelectric element 30 protrudes relative to neighboring portions of the panel 10 in the long-side direction 2a of the panel 10. On the other hand, the lower portion of the panel 10 that is attached with the display 20 is less likely to vibrate compared to the upper portion of the panel 10 that is attached with the piezoelectric element 30. As a result, the lower portion of the panel 10 provides less sound leakage due to the vibration occurring in the lower portion of the panel 10.

The electronic device 1 transmits sound by the vibration of the panel 10. In this regard, compared with cases where the piezoelectric element 30 is attached to the housing 60 to vibrate the housing 60, the user might drop the electronic device due to the vibration of the housing 60 during voice communication when the user holds the electronic device in the hand (since during voice communication the user usually holds the housing portion of the electronic device). In contrast, the electronic device 1, which vibrates the panel 10, hardly poses such a problem. Of course, however, the piezoelectric element 30 may also be attached to the housing 60 when the piezoelectric element 30 does not vibrate greatly.

FIGS. 24A to 24E illustrate a configuration of the electronic device 1 according to the fourth embodiment of the present disclosure in detail. FIG. 24A is a back view of the panel 10 to which the piezoelectric element 30 is attached in the electronic device 1, FIGS. 24B and 24D are sectional views of different patterns taken along a line X-X in FIG. 24A, and FIGS. 24C and 24E are sectional views of the different patterns taken along a line Y-Y in FIG. 24A. FIG. 24A illustrates a surface of the panel 10 that is visible from the side of the panel 10 on which the piezoelectric element 30 is disposed (and this also applies to the modifications below). As illustrated in FIGS. 24A to 24E, the piezoelectric element 30 is attached to the panel 10 by way of the intermediate member 110.

The Flexible Printed Circuit (FPC) 120 is attached to a surface (the second main surface) of the piezoelectric element 30 that opposes to another surface (the first main surface) of the piezoelectric element 30 that is attached to the intermediate member 110. The FPC 25 includes, for example, a film insulator (a base film) made of resin such as polyimide, a conductor layer (a signal line) formed on the base film, and an insulator covering the conductor layer except for an area corresponding to a terminal portion. The terminal portion of the FPC 25 and an electrode terminal portion of the piezoelectric element 30 are connected by adhesion using a joining material including, for example, a solder material, an anisotropic conductive material (an anisotropic conductive paste or an anisotropic conductive film) composed mainly of electrically insulating resin in which conductive particles are mixed, or the like.

The FPC 25 is attached to the left end portion of the second main surface of the piezoelectric element 30 and extends from the attaching position to be electrically connected to the controller 50 which is not illustrated. The FPC 25 conveys an electric signal applied from the controller 50 to the piezoelectric element 30 The modifications described below include the similar arrangement configuration of the FPC 25, and a description of the FPC 25 is omitted unless reference needs to be made particularly.

The intermediate member 110 is, for example, a member that prevents external force from being conveyed to the piezoelectric element 30 to reduce damage to the piezoelectric element caused by the external force. Such a member may be formed by, for example, an elastic material of organic synthetic rubber, a representative of which includes polybutadiene-based, nitrile-based, and chloroprene-based synthetic rubber, and inorganic synthetic rubber, such as silicone. The member may also be formed by a curable resin having thermosetting properties, thermoplasticity, moisture curable properties, ultraviolet-curable properties, or the like.

Furthermore, the intermediate member 110 is, for example, a member that prevents excessive deformation of the piezoelectric element 30. Such a member may be formed by, for example, a copper sheet, an iron sheet, or a phosphor bronze sheet. The member may also be formed by, for example, a stainless sheet or a metallic sheet made of aluminum having a certain degree of elasticity. The thickness of the metallic sheet, such as a stainless sheet, may be in the range from 0.2 mm to 0.8 mm and determined appropriately depending on a voltage value or the like applied to the piezoelectric element 30. Additionally, the member may also be formed by a plurality of metals, such as a metallic sheet including a copper sheet plated with silver, or a laminated sheet including a copper sheet and an aluminum sheet.

The intermediate member 110 may also include a composite of an organic material and an inorganic material (or metal). One example is a composite member (reinforced resin) obtained by mixing glass fiber, metallic fiber, carbon fiber, or the like into a polyimide-based resin as the base material. The strength, rigidity, and elasticity of the composite member may be controlled appropriately in accordance with the content of the glass fiber, metallic fiber, carbon fiber, or the like with respect to the polyamide-based resin. The reinforced resin as described above may be prepared, for example, by forming a medium by interleaving glass fiber, metallic fiber, carbon fiber, or the like, impregnating the medium with resin, and then curing the resin. The reinforced resin may also be prepared by mixing finely cut fiber pieces into liquid resin and subsequently curing the resin. Furthermore, the reinforced resin may be a lamination of a fiber-interleaved medium with layers of resin.

As described above, the piezoelectric element 30 is attached to the intermediate member 110 by the joining member 70, and the intermediate member 110 is attached to the panel 10 by the joining member 70. Herein, the joining member 70 includes a combination of different joining members (i.e., the first joining member 71 and the second joining member 81). In the present disclosure, the second joining member 81 is more flexible than the first joining member 71. For example, the first joining member 71 is the aforementioned curable resin (e.g., epoxy resin as a thermosetting resin), and the second joining member 81 is a double-sided adhesive tape including an acryl or a Polyethylene terephthalate (PET) base coated with an adhesive agent. The acryl or the Polyethylene terephthalate (PET) base has a film shape, a nonwoven fabric film shape, a cellular porous shape, or the like, and therefore, a double-sided adhesive tape with the base is more flexible than cured resin. Accordingly, compared with the first joining member 71, the second joining member 81 is more likely to be deformed in conjunction with deformation of other members joined with the joining member or more likely to mitigate propagation of external force to the other members.

The piezoelectric element 30 may be attached to the intermediate member 110 by using the first joining member 71 or the second joining member 81. In FIGS. 24A to 24E, the piezoelectric element 30 is attached to the intermediate member 110 by the second joining member 81. In the illustrated examples, flexibility of the second joining member 81 does not interfere with displacement of the piezoelectric element 30, and consequently, sound pressure characteristics are improved. When the first joining member 71 is used instead of the second joining member 81, the piezoelectric element 30 is attached to the intermediate member 110 more firmly, and separation of the piezoelectric element 30 from the intermediate member 110 is prevented.

In the electronic device 1 according to the present disclosure, in a predetermined area of the intermediate member 110 that includes at least an area located right below the piezoelectric element 30 in a direction in which the panel 10, the intermediate member 110, and the piezoelectric element 30 are laminated, the intermediate member 110 is attached to the panel 10 by the first joining member 71, and in at least a part of a periphery of the predetermined area, the intermediate member 110 is attached to the panel 10 by the second joining member 81.

Since the intermediate member 110 is attached to the panel 10 firmly by the first joining member in the predetermined area including at least the area located right below the piezoelectric element 30 in the direction in which the panel 10, the intermediate member 110, and the piezoelectric element 30 are laminated, external impact to the panel 10 caused by dropping or the like of the electronic device 1 is less likely to be propagated to the piezoelectric element 30, and consequently, the piezoelectric element 30 is protected from a crack or the like.

Furthermore, since the intermediate member 110 is attached to the panel 10 by the second joining member 81 that is more flexible than the first joining member 71 in a part of the periphery of the first joining member 71, the second joining member 81 mitigates impact propagating from a periphery of an area of the panel 10 where the intermediate member 110 is attached to the attached area of the panel 10 along the main surface of the panel 10, and consequently, the piezoelectric element 30 is protected from a crack or the like.

Although in FIGS. 24A to 24E a double-sided adhesive tape as the second joining member 81 is disposed over the entire marginal area of the area of the panel 10 where the intermediate member 110 is attached, the present embodiment is not necessarily limited to this configuration. For example, when the intermediate member 110 (or the piezoelectric element 30) is attached to an end portion on the upper side of the panel 10, impact is likely to propagate from an area of the panel 10 that is located on the lower side of the area where the intermediate member 110 is attached, and therefore, the double-sided adhesive tape may be disposed only on the lower side (i.e., on a side of the panel 10 that opposes to the end portion on the upper side) of the panel 10 in the attached area. The above configuration allows the second joining member 81 to efficiently mitigate impact propagating along the main surface of the panel 10.

According to the electronic device 1 of the present disclosure with the above configuration, a marginal area of a surface (the first main surface) of the intermediate member 110 that is attached to the panel 10 is attached to the panel 10 by a double-sided adhesive tape as the second joining member 81. Accordingly, the marginal area of the first main surface of the intermediate member 110 may be attached to the panel 10 by using the double-sided adhesive tape in advance to define space between the panel 10, the intermediate member 110, and the double-sided adhesive tape before a curable resin as the first joining member 71 is disposed, and then, the curable resin as the second joining member 81 may be filled into the space. That is to say, by disposing the double-sided adhesive tape between the panel 10 and the intermediate member 110, a passage for the curable resin is formed. By attaching the intermediate member 110 to the panel 10 by the second joining member 81 in advance, the space defined between the panel 10 and the intermediate member 110 is maintained, and the curable resin may be cured while maintaining a sufficient thickness in the space. Consequently, the intermediate member 110 is attached to the panel 10 more firmly. As illustrated in FIG. 24B (illustrating Pattern 1), the intermediate member 110 is provided in a part thereof with the through hole 100. Alternatively, as illustrated in FIG. 24D (illustrating Pattern 2), the panel 10 is provided in a part thereof with the through hole 100. The curable resin as the second joining member 81 may be filled through the through hole 100. The through hole 100 is the first hole through which the space defined between the panel 10, the intermediate member 110, and the double-sided adhesive tape communicates with the outside of the space. In the configuration of FIGS. 24D and 24E (illustrating Pattern 2), a bezel may also be provided to cover the through hole 100 provided in the panel 10. The bezel may extend from a part of the housing 60 that forms a side surface of the electronic device 1. The bezel covers the through hole 100 provided in the panel 10 to make the through hole 100 unexposed to the outside of the electronic device 1, and thus, the appearance is not spoiled.

The intermediate member 110 or the panel 10 may be further provided with the second hole that is different from the first hole, namely, the through hole 100. This configuration allows an adhesive agent to be filled into the space defined between the panel 10 and the intermediate member 110 through the first hole and also allows air that is present in the space to be vented to the outside through the second hole.

Although in the above configurations the first and the second hole are provided in the intermediate member 110 or the panel 10, the present embodiment is not limited to these examples, and at least one of the first and the second hole may be provided by forming a partial cut-out in the double-sided adhesive tape by which the intermediate member 110 is attached to the panel 10.

When the intermediate member 110 has a substantially rectangular shape as illustrated in FIGS. 24A to 24E, the double-sided adhesive tape as the second joining member 81 may be disposed in both edge portions of the first main surface of the intermediate member 110 along the longitudinal direction, not in both end portions along the short-side direction. By doing so, substantially rectangular space may be defined between the panel 10 and the intermediate member 110, with the first hole being provided in one end of the space in the longitudinal direction, and with the second hole being provided in another end of the space in the longitudinal direction.

FIGS. 25A to 25E illustrate the first modification of the fourth embodiment of the present disclosure. FIG. 25A is a back view of the panel 10 to which the intermediate member 110 and the piezoelectric element 30 are attached in the electronic device 1, FIGS. 25B and 25D are sectional views of different patterns taken along a line X-X in FIG. 25A, and FIGS. 25C and 25E are sectional views of the different patterns taken along a line Y-Y in FIG. 25A. In the present modification, a curable resin as the protective member 85 is applied to a surface (the second main surface) of the piezoelectric element 30 that opposes to another surface (the first main surface) of the piezoelectric element 30 attached to the intermediate member 110. Since the piezoelectric element 30 is covered by the protective member 85, the piezoelectric element 30 ought to be invisible from the surface of the panel 10 that is located on the side of the piezoelectric element 30 in FIG. 25A. However, for better comprehension of relative arrangement of the piezoelectric element 30 and other members, a portion corresponding to the piezoelectric element 30 is indicated in white so that the piezoelectric element 30 becomes visible in FIG. 24A (and this also applies to the modifications below). Furthermore, since the FPC 25 is attached to a part of the second main surface of the piezoelectric element 30 as described above, the protective member 85 is actually disposed to cover both the piezoelectric element 30 and the FPC 25. Accordingly, in FIG. 25A, a part of the FPC 25 that is covered by the protective member 85 and is invisible is represented by a dotted line. Additionally, the protective member 85 may also be attached to a part of the second main surface of the piezoelectric element 30 other than the area thereof to which the FPC 25 is attached (and this also applies to the modifications below).

In the electronic device 1 according to the present disclosure, the protective member 85 is attached to the second main surface of the piezoelectric element 30. The above configuration allows, when, for example, the impact caused by dropping or the like of the electronic device 1 brings the piezoelectric element 30 into contact with another member (e.g., a corner portion, an electronic member, or the like that protrudes inwardly in the housing 60) disposed near the piezoelectric element 30, the protective member 85 to mitigate the impact from the contact, thus preventing damage to the piezoelectric element 30.

A surface of the protective member 85 that opposes to another surface of the protective member 85 attached to the piezoelectric element 30 may have a convex curved shape. When, as illustrated in FIG. 25B, the protective member 85 has a convex curved surface in the section taken along the line Y-Y, it is experimentally known that the protective member 85 tends to be better deformed in conjunction with bending and displacement of the piezoelectric element 30 than in cases where the protective member 85 has a flat plate shape and has the same thickness as the thickest portion of the convex protective member. That is to say, the protective member 85 in a convex curved shape is less likely to interfere with deformation of the piezoelectric element 30 than that in a flat plate shape, and accordingly, prevents external force from damaging the piezoelectric element 30 while preventing a decrease in sound pressure.

One possible method of attaching the protective member 85 to the piezoelectric element 30 includes processing, for example, organic or inorganic synthetic resin to impart the resin with a flat surface portion to be attached to the piezoelectric element 30 and with a curved surface portion opposing to the flat surface portion and then, attaching the rubber to the piezoelectric element 30. Alternatively, the protective member 85 may be formed by applying or dripping the aforementioned curable resin to the surface of the piezoelectric element 30 that opposes to the surface of the piezoelectric element 30 attached to the panel 10 and then, curing the resin. At room temperature, even an uncured curable resin has a certain degree of viscosity. Accordingly, when being applied or dripped onto the piezoelectric element 30, the curable resin assumes a curved shape due to surface tension thereof and may be cured while maintaining the curved shape.

Although the protective member 85, which covers the second main surface of the piezoelectric element 30, is capable of preventing damage to the piezoelectric element 30, the present modification is not limited to this example, and the protective member 85 may also cover the second main surface of the piezoelectric element 30 and side surfaces extending from the second main surface. The above configuration allows the protective member 85 to mitigate impact even to the side surfaces of the piezoelectric element 30.

When the protective member 85 is made of a curable resin that is the same as a curable resin used as the panel 10 and the first joining member 71, the protective member 85 and the first joining member 71 may be integrally formed. That is to say, as illustrated in FIGS. 25B and 25D, the protective member 85 may be formed by filling the curable resin into the space defined between the panel 10 and the intermediate member 110 through the through hole 100 provided in the intermediate member 110 and subsequently, dripping the curable resin to cover an upper surface of the intermediate member 110 and the upper surface (the second main surface) of the piezoelectric element 30, and then, curing the resin. The above process simplifies operation compared with cases where the first joining member 71 and the protective member 85 are formed separately.

In FIGS. 25A to 25E, an area of a surface of the intermediate member 110 that is attached to the piezoelectric element 30 is larger than an area of the first main surface of the piezoelectric element 30. The intermediate member 110 has the surface that is larger than the first main surface of the piezoelectric element 30 in the X-X direction and the Y-Y direction, and dripping the curable resin as the protective member 85 to cover the larger surface allows all the surfaces, except for the first main surface, of the piezoelectric element 30 to be covered by the resin. At this time, since the intermediate member 110, which has the larger surface than the first main surface of the piezoelectric element 30, is disposed between the piezoelectric element 30 and the panel 10, the dripped curable resin is less likely to adhere to the panel 10.

In FIGS. 25D and 25E (illustrating Pattern 2), the surface (the first main surface) of the intermediate member 110 that is attached to the panel 10 is provided with one or more grooves as illustrated in FIG. 25E. The grooves provided in the intermediate member 110 increase an area over which the curable resin as the first joining member 71 and the intermediate member 110 are joined, and consequently, the curable resin and the intermediate member 110 are joined more firmly. Additionally, a surface of the intermediate member 110 that is attached to the panel 10 or the piezoelectric element 30 may be provided with a groove. With this configuration, the intermediate member 110 is attached to the panel 10 or to the piezoelectric element 30 more firmly.

FIGS. 26A to 26C illustrate the second modification of the fourth embodiment of the present disclosure. FIG. 26A is a back view of the panel 10 to which the intermediate member 110 and the piezoelectric element 30 are attached in the electronic device 1, FIG. 26B is a sectional view taken along a line X-X in FIG. 26A, and FIG. 26C is a sectional view taken along a line Y-Y in FIG. 26A. In the present modification, the intermediate member 110 includes a bottom surface portion to which the piezoelectric element 30 is attached and a wall surface portion standing from the bottom surface portion.

A curable resin as the protective member 85 may be poured into box-shaped inner space defined by the bottom surface portion and the wall surface portion of the intermediate member 110. Consequently, when an inner wall surface of the intermediate member 110 is higher than the second main surface of the piezoelectric element 30 (the upper surface of the piezoelectric element 30), the second main surface and the side surfaces of the piezoelectric element 30 are covered by the curable resin. (That is to say, substantially the entire piezoelectric element 30 is covered by the resin.) Accordingly, the curable resin as the protective member 85 further mitigates propagation of the impact to the piezoelectric element 30 caused by external force. Besides, fixing the piezoelectric element 30 by the curable resin prevents the piezoelectric element 30 from being detached from the intermediate member 110 in response to external impact or the like.

According to the present modification, since the intermediate member 110 has the substantially box shape including the bottom surface portion and the wall surface portion, a configuration where the piezoelectric element 30 is covered by the curable resin is easily achieved by pouring the resin into the box-shaped member.

The piezoelectric element 30 is attached to the intermediate member 110 by the first joining member 71 and the second joining member 81. The first main surface of the piezoelectric element 30 includes an edge area that is attached to intermediate member 110 by the second joining member 81 (e.g., a double-sided adhesive tape). The second joining member 81 is not attached to the entire edge area of the first main surface of the piezoelectric element 30. For example, as described earlier, a partial cut-out may be formed in the double-sided adhesive tape by which the intermediate member 110 is attached with the piezoelectric element 30. In FIG. 26B, the second joining member 81 (the double-sided adhesive tape) is not disposed (i.e., the cut-out is formed) in a part of the left end of the first main surface of the piezoelectric element 30 in the X-X direction. The part of the left end in which the second joining member 81 is not disposed serves as a passage for a curable resin as the first joining member 71.

The curable resin as the first joining member 71 may be poured into the substantially box-shaped space in the intermediate member 110 while the piezoelectric element 30 has been attached to the intermediate member 110 by the second joining member 81 in advance. This allows the curable resin to enter the space defined between the piezoelectric element 30 and the intermediate member 110 while the space is maintained, and the curable resin may be cured while maintaining a sufficient thickness. Consequently, the piezoelectric element 30 is attached to the intermediate member 110 more firmly.

Although in the electronic device 1 of FIGS. 26A to 26C the piezoelectric element 30 is attached to the intermediate member 110 by the first joining member 71 and the second joining member 81, the electronic device 1 does not necessarily need to have this configuration, and the piezoelectric element 30 may also be attached to the intermediate member 110 only by one of the first joining member 71 and the second joining member 81. For example, the entire first main surface of the piezoelectric element 30 may be attached to the intermediate member 110 by a double-sided adhesive tape as the second joining member 81.

Although in FIG. 26B the second joining member 81 is not disposed in the part of the edge area on the first main surface of the piezoelectric element 30, the present modification is not limited to this example, and the second joining member 81 may also be attached to the entire edge area on the first main surface of the piezoelectric element 30 (i.e., the area where the second joining member 81 is attached may form a closed area). In this case, all the areas, except for the edge area, of the first main surface of the piezoelectric element 30 are not joined to the panel 10 by any joining member. Accordingly, in all the areas, except for the edge area, of the first main surface of the piezoelectric element 30, deformation of the piezoelectric element 30 is not interfered with by any joining member. The above configuration improves sound pressure characteristics of the electronic device 1 by preventing interference in deformation of the piezoelectric element 30 compared with cases where the entire first main surface of the piezoelectric element 30 is attached to the panel 10 by the first joining member 71 or the second joining member 81.

In the present modification also, the intermediate member 110 may be provided in a part (e.g., the bottom surface portion) thereof with the through hole 100. Providing the through hole 100 allows the curable resin, which has been poured into the inner space of the intermediate member 110, to enter space defined between the intermediate member 110 and the panel 10 through the through hole. Once the curable resin is cured, the intermediate member 110 is attached to the panel 10.

Meanwhile, in some cases in assembly of members constituting the electronic device 1 during manufacturing of the electronic device 1 according to the present disclosure, a unit or the like including a predetermined combination of independent members or sets of members may be transported. Such a unit may include the piezoelectric element 30 attached to a predetermined plate-shaped member (the first plate-shaped member). Furthermore, in a predetermined area of the unit that includes at least an area located right below the piezoelectric element 30 in a direction in which the piezoelectric element 30 and the first plate-shaped member are laminated, such a unit may be attached to the first plate-shaped member by the first joining member (e.g., a curable resin), and in at least a part of a periphery of the predetermined area, such a unit may be attached to the first plate-shaped member by the second joining member (e.g., an adhesive agent) that is more flexible than the first joining member. This configuration allows the second joining member to mitigate external impact applied to the first plate-shaped member and propagated to the piezoelectric element 30 along the first plate-shaped member during transportation. Needless to say, when a surface of the first plate-shaped member other that opposes to another surface of the first plate-shaped member attached with the piezoelectric element 30 is attached to a predetermined plate-shaped member (the second plate-shaped member) that is different from the first plate-shaped member, the unit is capable of deforming the second plate-shaped member due to deformation of the piezoelectric element 30 to thereby transmit human-body vibration sound to an object that is in contact with the second plate-shaped member.

Such a unit may also include the protective member 85 attached to a surface of the piezoelectric element 30 that opposes to another surface of the piezoelectric element 30 attached to the panel 10. A surface of the protective member 85 that opposes to another surface of the protective member 85 attached to the piezoelectric element 30 may have a convex curved shape.

The piezoelectric element 30 included in the above unit does not necessarily need to be attached to a plate-shaped member. For example, the piezoelectric element 30 may be attached to a bottom surface of a predetermined box-shaped member. In this case, by forming a unit including the piezoelectric element 30 fixed in the box-shaped member in advance by pouring a curable resin into the box-shaped member, damage due to external impact or the like is further prevented during transportation. At this time, when at least a part of the piezoelectric element 30 is covered by the curable resin, external impact is mitigated by the curable resin during transportation.

In the above description of the configuration of the electronic device 1 according to the present disclosure, space to be filled with a curable resin as the first joining member 71 is formed with the second joining member 81 interposed between a flat surface portion of the intermediate member 110 and the panel 10. However, the way of forming the space is not limited to this example.

Figure 27C:
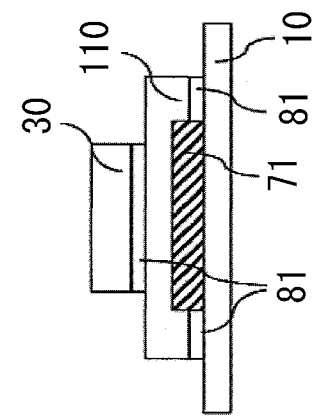
FIGS. 27A to 27C illustrate the third modification of the fourth embodiment of the present disclosure.
Figure 27A:
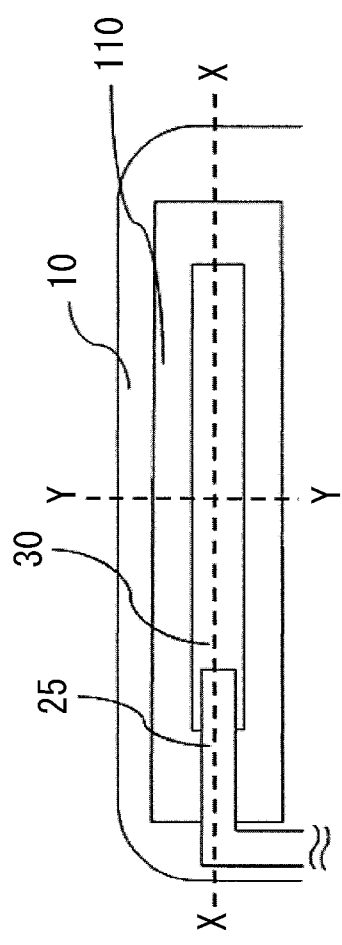
Figure 27B:
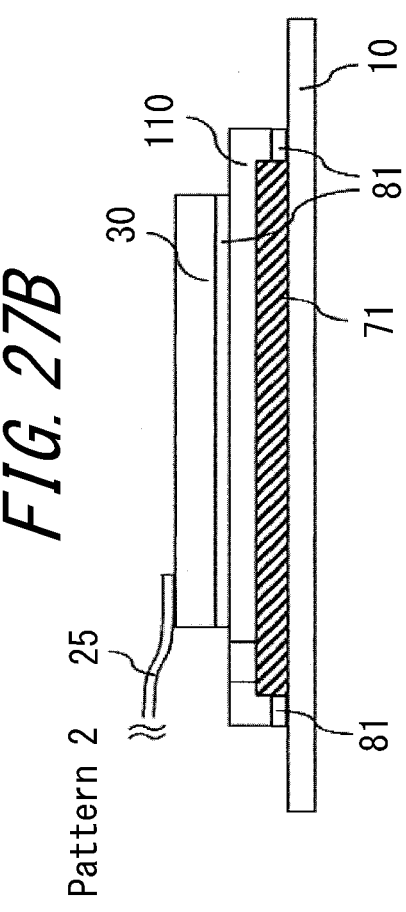

FIGS. 27A to 27C illustrate the third modification of the fourth embodiment of the present disclosure. FIG. 27A is a back view of the panel 10 to which the intermediate member 110 and the piezoelectric element 30 are attached in the electronic device 1, FIG. 27B is a sectional view taken along a line X-X in FIG. 27A, and FIG. 27C is a sectional view taken along a line Y-Y in FIG. 27A. As illustrated in FIGS. 27A to 27C, the intermediate member 110 having a concave shape is used, and an aperture surface of the intermediate member 110 is attached to the panel 10 by the second joining member 81. The above configuration provides a larger space to be filled with a curable resin as the first joining member 71 compared with cases where the flat surface portion of the intermediate member 110 is attached to the panel 10.

Although the present disclosure has been described based on the drawings and the embodiments thereof, it is to be noted that a person skilled in the art may easily make various changes and modifications according to the present disclosure. Therefore, such changes and modifications are to be understood as included within the scope of the present disclosure. For example, functions and so forth included in the members, steps, or the like may be rearranged as long as the functions and the like are logically consistent. A plurality of component parts, the steps, and the like may also be integrated or separated.

Figure 28:
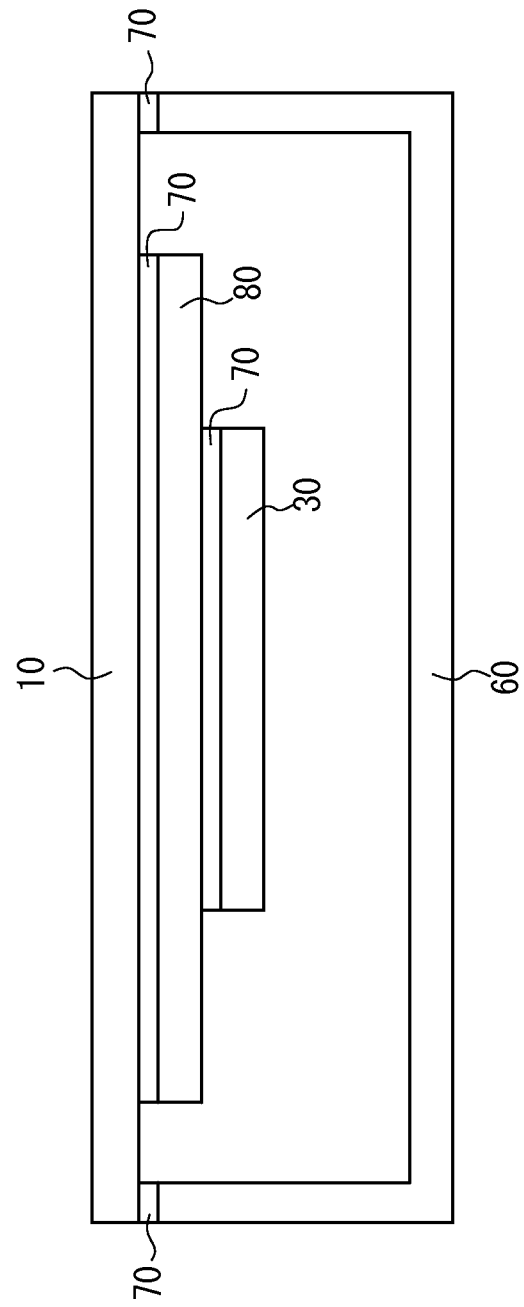
FIG. 28 illustrates one example of joining between a panel and a housing.

For example, as illustrated in FIG. 28, the panel 10 may be configured to be joined to the housing 60 by the joining member 70. Thus preventing direct propagation of the vibration of the panel 10 to the housing 60 makes it less likely that the user will drop the electronic device 1 compared with cases where the housing itself undergoes a large vibration. The joining member 70 may also be an adhesive agent that is not thermosetting. This provides an advantage that contraction due to a thermal stress is less likely to occur between the housing 60 and the panel 10 during curing. The joining member 70 may also be a double-sided adhesive tape. This provides an advantage that a contraction stress, which often occurs when an adhesive agent is used, is less likely to be generated between the housing 60 and the panel 10.

When the panel 10 and the display unit 20 are not superposed, for example, the piezoelectric element 30 may be disposed in the middle of the panel 10. When the piezoelectric element 30 is disposed in the middle of the panel 10, the vibration of the piezoelectric element 30 is evenly transmitted to the whole panel 10, thereby improving a quality of air conduction sound and allowing the user to perceive human-body vibration sound even when the user places the ear in contact with the panel 10 at different positions of the panel 10. Note that, similarly to the above embodiments, the piezoelectric element 30 may be provided in plurality.

Although in the above electronic device 1 the piezoelectric element 30 is adhered to the panel 10, the piezoelectric element 30 may be attached to another place than the panel 10. For example, the piezoelectric element 30 may be adhered to a battery lid that is configured to be attached to the housing 60 to cover a battery. Since the battery lid is often attached to a surface different from the panel 10 in the electronic device 1 such as the mobile phone, the above configuration enables the user to listen to sound by placing a part of the body (e.g., the ear) in contact with the surface different from the panel 10.

The panel 10 may form a part or an entirety of any one of a display panel, an operation panel, a cover panel, and a lid panel that allows a rechargeable battery to be detachable. Preferably, when the panel 10 is a display panel, the piezoelectric element 30 is disposed outside of a display area provided for display function. The above structure provides an advantage that display is less likely to be disturbed by the piezoelectric element 30. The operation panel includes the touch panel of the first embodiment. The operation panel may also include a sheet key, namely, a member of the foldable mobile phone or the like that is integrally provided with a key top as the operation key and that forms one surface of the housing on an operational side.

Meanwhile, in the first and the second embodiment, the joining member used for adhering the panel 10 with the piezoelectric element 30, the joining member used for adhering the panel 10 to the housing 60, and the like are denoted by the same reference numeral as the joining member 70. However, the joining member used in the first and the second embodiment may be varied appropriately depending on the members to be joined.

Furthermore, although a double-sided adhesive tape or an adhesive agent is described as an example of the joining member 70 used to joining the panel 10 to the housing 60, a double-sided adhesive tape and an adhesive agent may be used not alone but together. In this case, a double-sided adhesive tape may be applied to the housing 60, and an adhesive agent having a higher adhesive strength than the double-sided adhesive tape may be applied over the double-sided adhesive tape, to join the panel 10 to the housing 60. The double-sided adhesive tape and the adhesive agent are adhered to each other firmly, and consequently, the panel 10 and the housing 60 are joined firmly. Furthermore, an adhesive agent does not need to be applied over a double-sided adhesive tape and may be partially cut out, and an adhesive agent may be filled into space obtained by the cut-out to join the panel 10 and the housing 60. The adhesive agent used herein may be an adhesive agent that is not thermosetting or a moisture curable elastic adhesive agent that reacts with water (moisture) and is moisture-cured. A moisture curable elastic adhesive agent may be mainly composed of a silyl group-containing special polymer.

In the above description, the electronic device 1 according to the present disclosure includes the panel 10 attached with the piezoelectric element 30, and sound is generated due to displacement of the piezoelectric element 30. However, sound may be generated by a member other than the panel 10. Any member that constitutes the electronic device 1 and that has a substantially flat plate shape in part may generate sound. Examples of such a member may include a case member constituting the housing of the electronic device 1 and a battery cover made of polycarbonate and attached detachably to the case member. One example is a box-shaped case member including a substantially rectangular bottom surface and side surfaces extending vertically from end portions of four sides of the bottom surface, and the piezoelectric element 30 may be attached to the bottom surface of the case member. In this example, the bottom surface of the case member is vibrated due to displacement of the piezoelectric element 30 to generate sound.

Although the embodiments of the present disclosure are described based on examples using a smartphone, using a smartphone is not mandatory. A mobile phone with one housing for operation and another housing for display which are connected in a foldable manner may also be used. Other examples of a mobile phone include a sliding-type with one housing for operation and another housing for display, both of which may be superposed or one of which may be slid in one direction, a turning-type with one housing for operation and another housing for display, one of which may be turned about an axis extending along a direction in which the housings are superposed, and a straight-type with one housing for operation and another housing for display, both of which are disposed in a singe housing and do not include a joint. A "two-axis hinge-type" mobile phone that may be flip opened and flip closed and turned may also be used.

The electronic device and the unit disclosed herein are described as having various functional parts configured to execute preferable functions. Note that the functional parts are merely illustrated schematically for simplification of description of the functionality and do not necessarily represent specific hardware or software. In this sense, any hardware or software that practically executes the preferable functions described herein may be implemented as the functional parts and other components. Various functions of different components may be achieved by any hardware and software used in combination or alone, and these may be adopted separately or in combination of two or more. Thus, various aspects of the present disclosure may be implemented in many different embodiments without departing from the scope of the present disclosure.

REFERENCE SIGNS LIST 1 electronic device
10 panel
20 display
25 FPC
30 piezoelectric element
30a first main surface
30b plus electrode terminal
30c minus electrode terminal
30d second main surface
40 input unit
50 controller
55 electronic member
60 housing
70 joining member
71 first joining member
80 reinforcing member
81 second joining member
85 protective member
90 supporting portion
91 cover member
95 frame member
100 through hole
110 intermediate member

The invention claimed is:

1. A unit, comprising:
a panel;
a piezoelectric element attached to the panel; and
a substrate attached to a main surface of the piezoelectric element, wherein
the panel is configured to be vibrated by the piezoelectric element, and sound is transmitted by the panel vibrating a part of a human body that is in contact with the vibrated panel,
the substrate includes a base made of resin and at least one signal line laminated with the base and connected to the main surface of the piezoelectric element,
substantially the entire main surface of the piezoelectric element is covered by the base,
the piezoelectric element includes a first main surface and a second main surface opposing to the first main surface, and the substrate is attached to the first main surface, and the second main surface is attached to the panel,
the piezoelectric element is provided, on one end portion of the first main surface in a longitudinal direction of the piezoelectric element, with a plus electrode terminal and also provided, on another end portion of the first main surface in the longitudinal direction, with a minus electrode terminal, and
the substrate includes a first signal line electrically connected to the plus electrode terminal and a second signal line electrically connected to the minus electrode terminal.

2. The unit of claim 1, wherein
the substrate is disposed between the panel and the piezoelectric element.

3. The unit of claim 1, wherein
the substrate includes an extension extended from one end portion in a longitudinal direction of the piezoelectric element, and
the extension is connected with an electronic member that is different from the piezoelectric element.

4. An electronic device, comprising:
at least the unit of claim 1.

5. An electronic device, comprising:
a housing;
a panel attached to the housing;
a piezoelectric element attached to the panel, wherein
the panel is configured to be deformed due to deformation of the piezoelectric element, and human-body vibration sound is transmitted to an object that is in contact with the deformed panel; and
a protective member attached to a surface of the piezoelectric element that opposes to another surface of the piezoelectric element attached to the panel, wherein
a surface of the protective member that opposes to another surface of the protective member attached to the piezoelectric element has a convex curved shape.

6. The electronic device of claim 5, wherein
the protective member covers both the surface of the piezoelectric element that is attached with the protective member and side surfaces extending from the surface of the piezoelectric element that is attached with the protective member.

7. An electronic device, comprising:
a housing;
a piezoelectric element;
a panel attached to the housing;
an intermediate member disposed between the panel and the piezoelectric element, wherein
the panel is configured to be deformed due to deformation of the piezoelectric element, and human-body vibration sound is transmitted to an object that is in contact with the deformed panel, and
the piezoelectric element is attached to the intermediate member; and
a protective member attached to a surface of the piezoelectric element that opposes to another surface of the piezoelectric element attached to the intermediate member, wherein
a surface of the protective member that opposes to another surface of the protective member attached to the piezoelectric element has a convex curved shape.

8. The electronic device of claim 7, wherein
the protective member covers both the surface of the piezoelectric element that is attached with the protective member and side surfaces extending from the surface of the piezoelectric element that is attached with the protective member.

9. The electronic device of claim 8, wherein
an area of a surface of the intermediate member that is attached with the piezoelectric element is larger than an area of the other surface of the piezoelectric element that is attached to the intermediate member.

10. The electronic device of claim 7, wherein
the intermediate member is attached to the panel and the piezoelectric element by a joining member, and
a surface of the intermediate member that is attached with the panel or the piezoelectric element is provided with a groove.

11. A method of manufacturing an electronic device including:
a housing;
a panel attached to the housing;
a frame member including a wall surface portion surrounding the piezoelectric element and a bottom surface portion extending from the wall surface portion; and
a piezoelectric element attached to the frame member, wherein
the panel is configured to be deformed due to deformation of the piezoelectric element, and human-body vibration sound is transmitted to an object that is in contact with the deformed panel, the method comprising the step of:
covering a surface of the piezoelectric element that opposes to another surface of the piezoelectric element attached to the frame member with curable resin, by pouring the curable resin into a substantially box-shaped mold defined by the wall surface portion and the bottom surface portion of the frame member and curing the curable resin, and wherein
an edge area of the bottom surface portion is attached to the panel by a first joining member, and
the bottom surface portion is provided, in at least a part thereof, with a through hole through which the curable resin is filled to space defined between the panel and the bottom surface portion.

12. A unit, comprising:
a piezoelectric element; and
a protective member attached to a predetermined surface of the piezoelectric element, wherein
when another surface of the piezoelectric element that is different from the predetermined surface of the piezoelectric element is attached to a predetermined plate-shaped member, the plate-shaped member is deformed due to deformation of the piezoelectric element, and human-body vibration sound is transmitted to an object that is in contact with the deformed plate-shaped member, and
a surface of the protective member that opposes to another surface of the protective member attached to the piezoelectric element has a convex curved shape.

13. A unit, comprising:
a first plate-shaped member; and
a piezoelectric element attached to the first plate-shaped member, wherein
when a surface of the first plate-shaped member that opposes to another surface of the first plate-shaped member attached with the piezoelectric element is attached to a second plate-shaped member that is different from the first plate-shaped member, the second plate-shaped member is deformed due to deformation of the piezoelectric element, and human-body vibration sound is transmitted to an object that is in contact with the deformed second plate-shaped member; and
a protective member attached to a surface of the piezoelectric element that opposes to another surface of the piezoelectric element attached to the first plate-shaped member, wherein
a surface of the protective member that opposes to another surface of the protective member attached to the piezoelectric element has a convex curved shape.

14. A unit, comprising:
a box-shaped member; and
a piezoelectric element attached to a bottom surface portion on an inner side of the box-shaped member, wherein
when a surface at bottom of the box-shaped member that opposes to another surface at bottom of the box-shaped member attached with the piezoelectric element is attached to a predetermined plate-shaped member, the plate-shaped member is deformed due to deformation of the piezoelectric element, and human-body vibration sound is transmitted to an object that is in contact with the deformed plate-shaped member, and
at least a part of the piezoelectric element is covered by curable resin that has been poured into the box-shaped member and cured.

15. An electronic device, comprising:
a panel;
a piezoelectric element;
a housing to which the panel is attached; and
an intermediate member attached to the panel and the piezoelectric element and disposed between the piezoelectric element and the panel, wherein
the panel is configured to be deformed due to deformation of the piezoelectric element, and human-body vibration sound is transmitted to an object that is in contact with the deformed panel, and
in a predetermined area of the intermediate member that includes at least an area located right below the piezoelectric element in a direction in which the panel, the intermediate member, and the piezoelectric element are laminated, the intermediate member is attached to the panel by a first joining member, and in at least a part of a periphery of the predetermined area, the intermediate member is attached to the panel by a second joining member that is more flexible than the first joining member.

16. The electronic device of claim 15, wherein
the intermediate member is attached to one end side of the panel, and
the second joining member is disposed on an opposite side to the one end side of the panel in an area over which the intermediate member is attached to the panel.

17. The electronic device of claim 15, wherein
the first joining member comprises a curable resin.

18. The electronic device of claim 15, wherein
the second joining member comprises a double-sided adhesive tape.

19. The electronic device of claim 15, further comprising:
a protective member attached to a surface of the piezoelectric element that opposes to another surface of the piezoelectric element attached to the intermediate member, wherein
a surface of the protective member that opposes to another surface of the protective member attached to the piezoelectric element has a convex curved shape.

20. The electronic device of claim 19, wherein
the protective member covers both the surface of the piezoelectric element that is attached with the protective member and side surfaces extending from the surface of the piezoelectric element that is attached with the protective member.

21. The electronic device of claim 15, wherein
a surface of the intermediate member that is attached with the panel or the piezoelectric element is provided with a groove.

22. A method of manufacturing an electronic device including:
a panel;
a piezoelectric element;
a housing to which the panel is attached;
an intermediate member attached to the panel and the piezoelectric element and disposed between the piezoelectric element and the panel; and
a joining member used to attach the intermediate member to the panel, wherein
the panel is configured to be deformed due to deformation of the piezoelectric element, and human-body vibration sound is transmitted to an object that is in contact with the deformed panel,
space is defined between the panel, the intermediate member, and the joining member, and
the space is provided with a first hole through which the space communicates with outside of the space, the method comprising the step of:
filling curable resin to the space from the first hole.

23. The method of claim 22 of manufacturing an electronic device, wherein
the space is further provided with a second hole through which the space communicates with the outside, the second hole being different from the first hole, and
an adhesive agent is filled to the space through the first hole, and air that is present in the space is expelled to the outside through the second hole.

24. The method of claim 23 of manufacturing an electronic device, wherein
the piezoelectric element has a rectangular shape,
the joining member is attached to both edge portions of a predetermined surface of the piezoelectric element along a longitudinal direction thereof,
the space has a substantially rectangular shape,
the first hole is provided on one end of the space in the longitudinal direction, and
the second hole is provided on another end opposing to the one end of the space in the longitudinal direction.

25. The method of claim 22 of manufacturing an electronic device, wherein
the intermediate member includes a bottom surface portion to which the piezoelectric element is attached and a wall surface portion standing from the bottom surface portion, and
the curable resin is poured into box-shaped inner space defined by the bottom surface portion and the wall surface portion and cured, and a surface of the piezoelectric element that opposes to another surface of the piezoelectric element attached to the intermediate member is covered by the curable resin.

26. A unit, comprising:
a first plate-shaped member; and
a piezoelectric element attached to the first plate-shaped member, wherein
when a surface of the first plate-shaped member that opposes to another surface of the first plate-shaped member attached with the piezoelectric element is attached to a second plate-shaped member that is different from the first plate-shaped member, the second plate-shaped member is deformed due to deformation of the piezoelectric element, and human-body vibration sound is transmitted to an object that is in contact with the deformed second plate-shaped member, and
in a predetermined area that includes at least an area located right below the piezoelectric element in a direction in which the piezoelectric element and the first plate-shaped member are laminated, the piezoelectric element is attached to the first plate-shaped member by a first joining member, and in at least a part of a periphery of the predetermined area, the piezoelectric element is attached to the first plate-shaped member by a second joining member that is more flexible than the first joining member.

27. A unit, comprising:
a box-shaped member; and
a piezoelectric element attached to a bottom surface portion on an inner side of the box-shaped member, wherein
when a surface at bottom of the box-shaped member that opposes to another surface at bottom of the box-shaped member attached with the piezoelectric element is attached to a predetermined plate-shaped member, the plate-shaped member is deformed due to deformation of the piezoelectric element, and human-body vibration sound is transmitted to an object that is in contact with the deformed plate-shaped member, and
in a predetermined area that includes at least an area located right below the piezoelectric element in a direction in which the piezoelectric element and the bottom surface portion of the box-shaped member are laminated, the piezoelectric element is attached to the box-shaped member by a first joining member, and in at least a part of a periphery of the predetermined area, the piezoelectric element is attached to the box-shaped member by a second joining member that is more flexible than the first joining member.

28. The unit of claim 26, further comprising:
a protective member attached to a surface of the piezoelectric element that opposes to another surface of the piezoelectric element attached to the panel.

29. The unit of claim 28, wherein
a surface of the protective member that opposes to another surface of the protective member attached to the piezoelectric element has a convex curved shape.

30. A unit, comprising:
a panel;
a piezoelectric element attached to the panel; and
a substrate attached to a main surface of the piezoelectric element, wherein
the panel is configured to be vibrated by the piezoelectric element, and sound is transmitted by the panel vibrating a part of a human body that is in contact with the vibrated panel,
the substrate includes a base made of resin and at least one signal line laminated with the base and connected to the main surface of the piezoelectric element,
substantially the entire main surface of the piezoelectric element is covered by the base,
the piezoelectric element is provided, on one end portion of a main surface in a longitudinal direction of the piezoelectric element, with a plus electrode terminal and also provided, on another end portion of the main surface in the longitudinal direction, with a minus electrode terminal, and the substrate includes a first signal line electrically connected to the plus electrode terminal and a second signal line electrically connected to the minus electrode terminal.

* * * * *